(12) United States Patent
González Díaz et al.

(10) Patent No.: US 12,493,026 B2
(45) Date of Patent: Dec. 9, 2025

(54) TISSUE ENGINEERED 3D MODELS FOR CANCER METASTASIS

(71) Applicant: The Board of Trustees of the Leland Stanford Junior University, Stanford, CA (US)

(72) Inventors: Eva Carolina González Díaz, Palo Alto, CA (US); Fan Yang, Stanford, CA (US)

(73) Assignee: THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 799 days.

(21) Appl. No.: 17/763,412

(22) PCT Filed: Sep. 24, 2020

(86) PCT No.: PCT/US2020/052576
§ 371 (c)(1),
(2) Date: Mar. 24, 2022

(87) PCT Pub. No.: WO2021/062051
PCT Pub. Date: Apr. 1, 2021

(65) Prior Publication Data
US 2022/0390434 A1 Dec. 8, 2022

Related U.S. Application Data

(60) Provisional application No. 62/906,005, filed on Sep. 25, 2019.

(51) Int. Cl.
*G01N 33/50* (2006.01)
*C12M 1/12* (2006.01)
*C12M 3/00* (2006.01)
*C12N 5/09* (2010.01)

(52) U.S. Cl.
CPC ......... *G01N 33/5011* (2013.01); *C12M 21/08* (2013.01); *C12M 25/14* (2013.01); *C12N 5/0693* (2013.01); *G01N 33/5082* (2013.01); *C12N 2513/00* (2013.01); *C12N 2533/30* (2013.01); *C12N 2533/50* (2013.01)

(58) Field of Classification Search
CPC ........... G01N 33/5011; G01N 33/5082; C12M 25/14; C12N 5/0693; C12N 2513/00; C12N 2533/30; C12N 5/0012; C12N 5/0075; C12N 5/0697
See application file for complete search history.

(56) References Cited

U.S. PATENT DOCUMENTS

| | | |
|---|---|---|
| 2004/0126405 A1 | 7/2004 | Sahatjian et al. |
| 2014/0017284 A1 | 1/2014 | Yang et al. |
| 2018/0371415 A1 | 12/2018 | Vunjak-Novakovic et al. |
| 2019/0185818 A1 | 6/2019 | Sikora et al. |
| 2019/0185819 A1 | 6/2019 | Soto-Gutierrez et al. |

FOREIGN PATENT DOCUMENTS

WO   WO 2021/062051   4/2021

OTHER PUBLICATIONS

Rogan, H., Ilagan, F., Tong, X., Chu, C.R. and Yang, F., 2020. Microribbon-hydrogel composite scaffold accelerates cartilage regeneration in vivo with enhanced mechanical properties using mixed stem cells and chondrocytes. Biomaterials, 228, p. 119579. (Year: 2020).*
International Preliminary Report on Patentability issued Mar. 15, 2022 in International Application No. PCT/US2020/052576.
International Search Report and Written Opinion mailed on Feb. 17, 2021 for International Application No. PCT/US2020/052576.

* cited by examiner

*Primary Examiner* — Fereydoun G Sajjadi
*Assistant Examiner* — Masudur Rahman
(74) *Attorney, Agent, or Firm* — Knobbe, Martens, Olson & Bear, LLP

(57) ABSTRACT

Engineered tissue models based on three-dimensional (3D) scaffolds, also referred to herein as tissue-engineered 3D models, can be used as in vitro diagnostic and drug screening tools for predicting, preventing and/or treating cancer metastases.

24 Claims, 27 Drawing Sheets

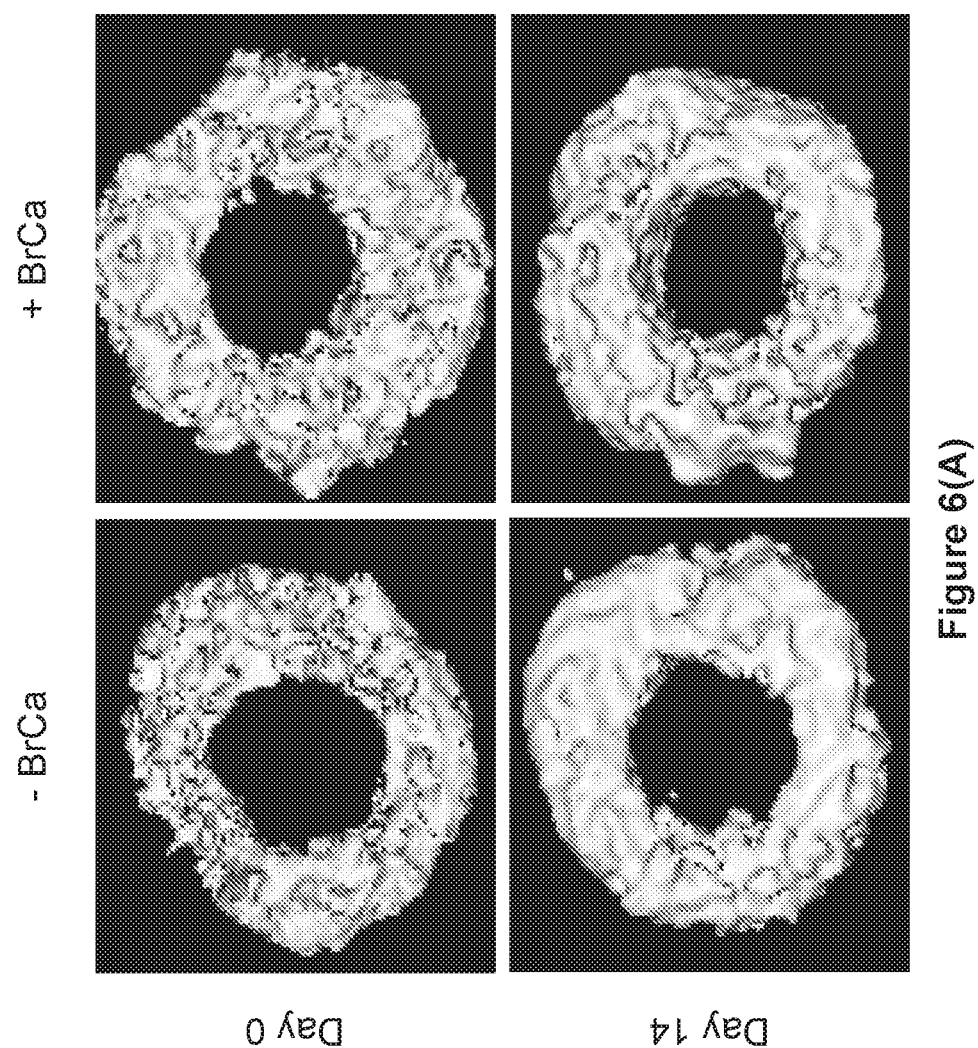

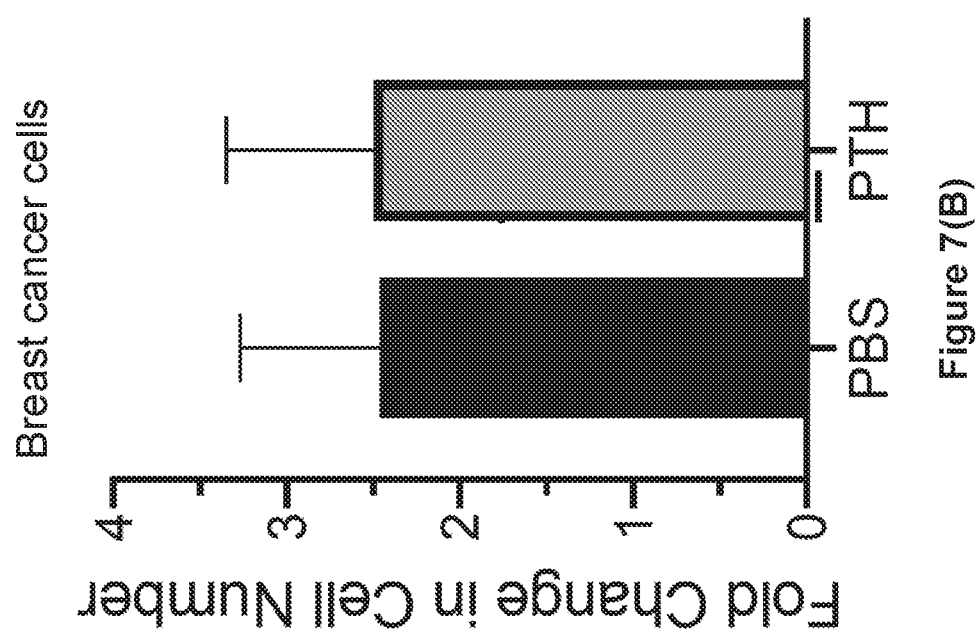

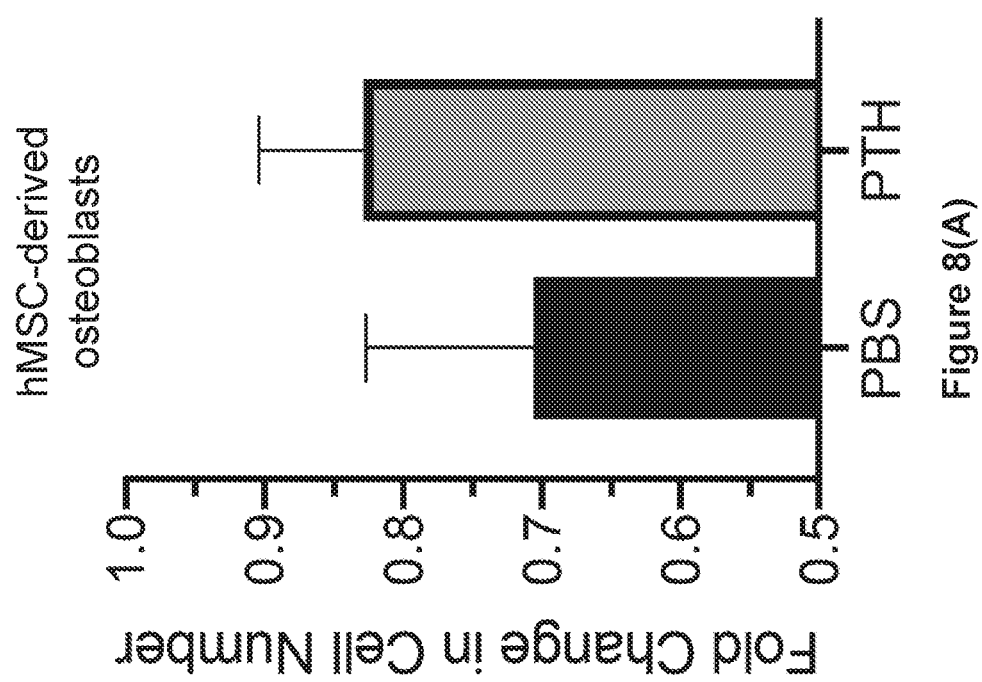

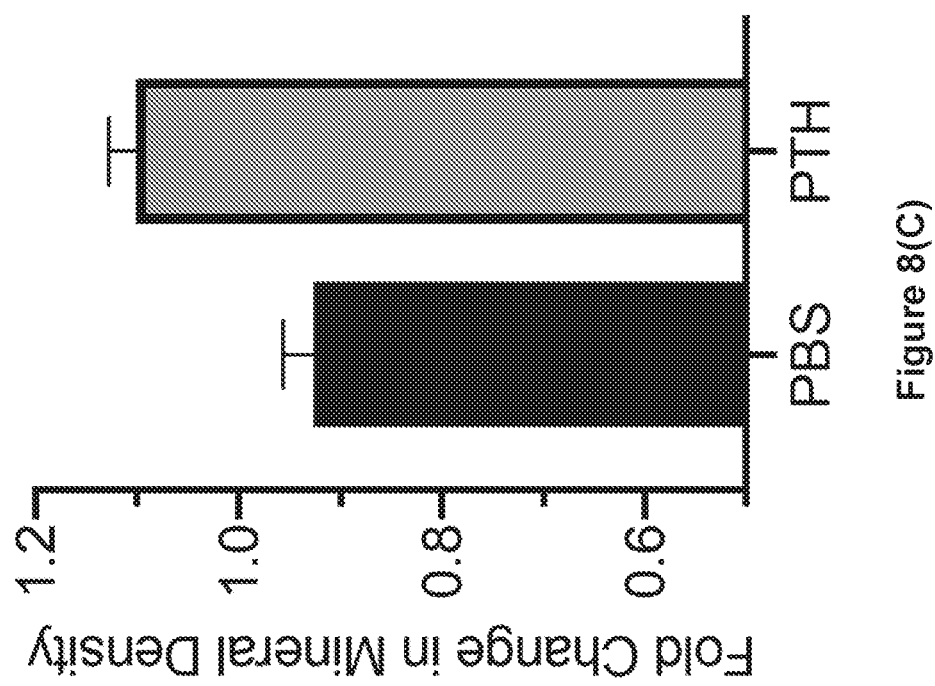

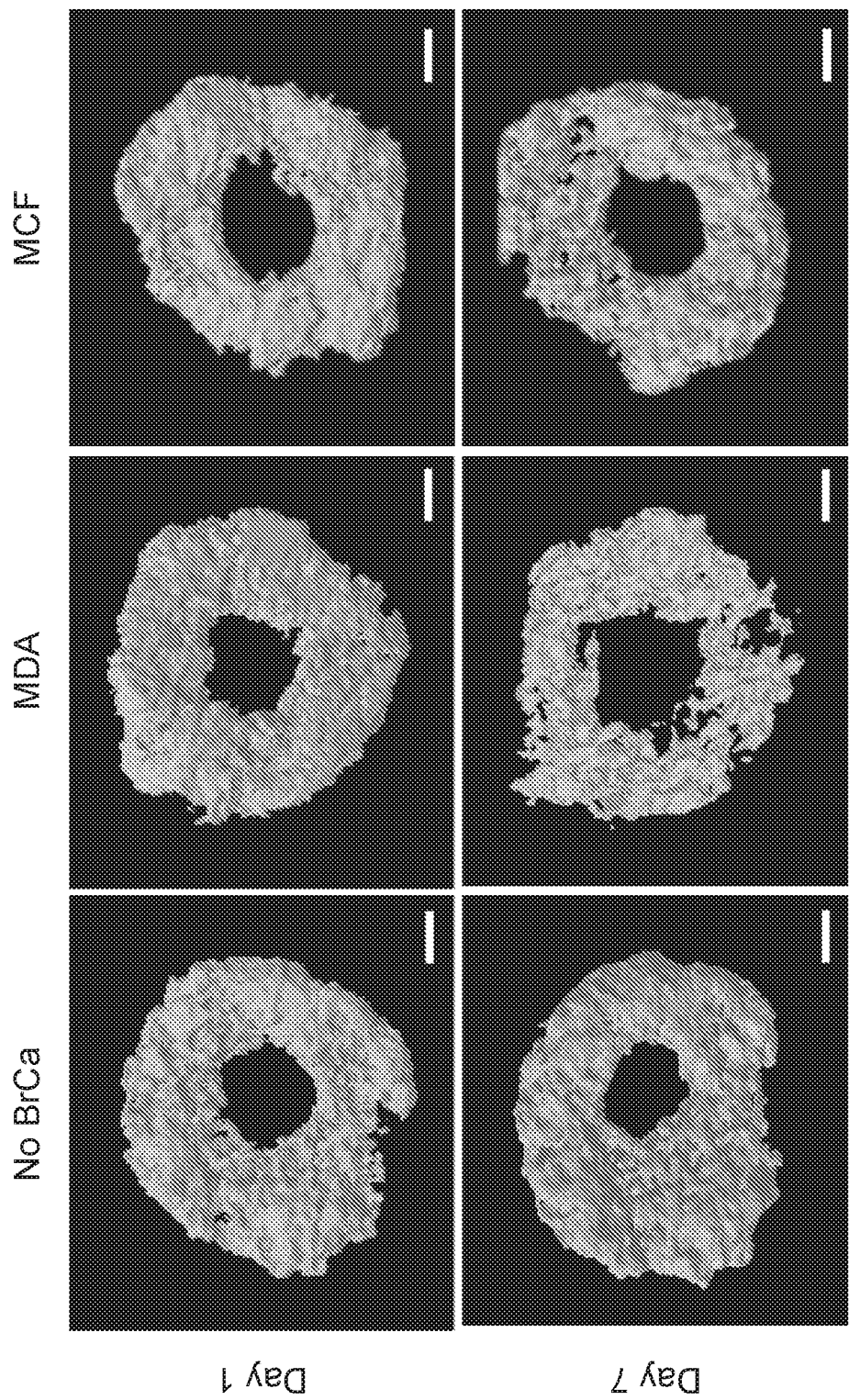

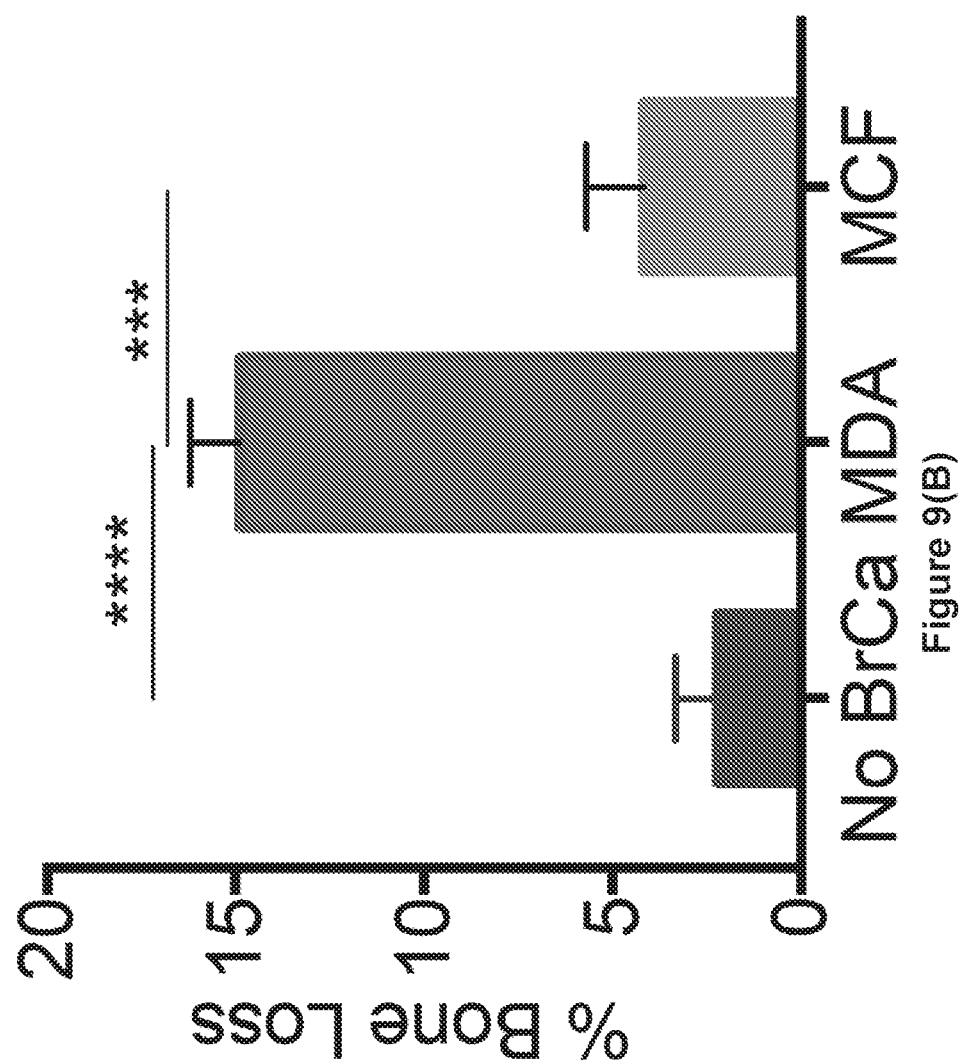

TISSUE ENGINEERED 3D MODELS FOR CANCER METASTASIS

CROSS-REFERENCE TO RELATED APPLICATIONS

This application is the U.S. National Phase Application under 35 U.S.C. § 371 of International Application No. PCT/US2020/052576, filed Sep. 24, 2020, designating the U.S. and published in English as WO 2021/062051 A1 on Apr. 1, 2021, which claims the benefit of U.S. Provisional Application 62/906,005 filed on Sep. 25, 2019, which is hereby incorporated by reference in its entirety.

BACKGROUND

Field

The present disclosure is related to engineered tissue models based on three-dimensional (3D) scaffolds. More specifically, in several embodiments, the 3D scaffolds are spatially patterned and used for studying cancer metastasis.

Description of the Related Art

Cancer metastasis is common and responsible for most cancer-associated death. Conventional in vitro cancer culture rely on growing cancer cells on tissue culture plastic in 2D, which do not allow evaluating cancer metastasis due to the absence of 3D extracellular matrix, and often shows poor correlation with in vivo drug responses. Animal models are more physiologically relevant, but are much more costly, slow, and not suitable for high-throughput drug screening studies.

SUMMARY

In some embodiments, a spatially-patterned 3D co-culture model comprises a first 3D scaffold comprising a plurality of cells from a target tissue of potential metastasis, and a second 3D scaffold comprising a plurality of tumor cells/cancer cells. The target tissue is selected from the group consisting of bone, cartilage, liver, lung, pancreas, brain, spleen, kidney, prostate, and muscle. The tumor cells/cancer cells are obtained from a tumor/cancer selected from the group consisting of breast cancer, liver cancer, esophageal cancer, prostate cancer, lung cancer, brain cancer, adenocarcinoma, skin cancer, melanoma, and pancreatic cancer.

In some embodiments, the spatially-patterned 3D co-culture model is configured to assess a metastatic characteristics of the tumor cell/cancer cell towards the target tissue. The metastatic characteristics are selected from the group consisting of degree of metastasis, and speed of metastasis. The degree of metastasis is determined by the fraction of the cancer cells that have migrated from the second 3D scaffold to the first 3D scaffold.

In some embodiments of the spatially-patterned 3D co-culture model, the first and second 3D scaffold comprises a natural polymers selected from the group consisting of gelatin, glycosaminoglycans, hyaluronic acid, chondroitin sulfate, heparin sulfate, and, combinations thereof.

In some embodiments of the spatially-patterned 3D co-culture model, the first and second 3D scaffold comprises a synthetic polymer selected from the group consisting of poly(ethylene glycol), poly(lactic-co-glycolic acid), poly (lactic acid), poly(glycolic acid), polycaprolactone, and combinations thereof.

In some embodiments of the spatially patterned 3D co-culture model, the first and second 3D scaffold comprises varying ratios of the natural and synthetic polymers.

In some embodiments of the spatially-patterned 3D co-culture model, the first and second 3D scaffold comprises a co-spun 3D scaffold with varying ratios of the natural and synthetic polymers, a physical mixture of co-spun 3D scaffolds with varying ratios of the natural and synthetic polymers, and/or a combination thereof.

In some embodiments of the spatially-patterned 3D co-culture model, the first and second 3D scaffold comprises a decellularized extracellular matrix composition from one or more tissues selected from the group consisting such as bone, cartilage, muscles, fat, brain, liver, spleen, lymph node, and lung.

In some embodiments of the spatially-patterned 3D co-culture model, the first and second 3D scaffold comprises components mimicking minerals in native extracellular matrix including hydroxyapatite nanoparticles, hydroxyapatite microparticles, tricalcium phosphate nanoparticles, tricalcium phosphate microparticles.

In some embodiments of the spatially-patterned 3D co-culture model, the first and second 3D scaffolds interface with each other such that the second 3D scaffold is, without limitations, concentric with, adjacent to, completely surrounded by, partially surrounded by, dispersed within, interspersed within, overlays, and/or overlaid with the first 3D scaffold.

In some embodiments, a method of predicting cancer metastasis comprises providing a model, comprising a first 3D scaffold comprising a plurality of cells from a target tissue of potential metastasis, and a second 3D scaffold comprising a plurality of cells from a tumor/a cancer, determining a speed of migration and a degree of migration of the plurality of cells from the tumor/the cancer to the target tissue of potential metastasis.

In some embodiments, a method for evaluating the potential for a tumor cell to metastasize from a first tissue to a second tissue comprises obtaining a plurality of tumor/cancer cells from a subject, introducing at least a portion of the plurality of tumor/cancer cells into a first 3D scaffold, introducing the first 3D scaffold into a second 3D scaffold comprising a plurality of cells from a target tissue into which the tumor/cancer cells potentially metastasize, assembling the first and the second 3D scaffolds to generate a physical interface between the scaffolds that mimics an in vivo environment where a potential metastasis of the tumor/cancer cells could occur, co-culturing the assembled scaffolds for a period of time sufficient to allow a portion of the tumor/cancer cells in the first 3D scaffold to infiltrate the second 3D scaffold, and evaluating the degree of infiltration. In some embodiments, the first and second 3D scaffold comprises a natural polymers selected from the group consisting of gelatin, glycosaminoglycans, hyaluronic acid, chondroitin sulfate, heparin sulfate, and, combinations thereof. In some embodiments, the first and second 3D scaffold comprises a synthetic polymer selected from the group consisting of poly(ethylene glycol), poly(lactic-co-glycolic acid), poly(lactic acid), poly(glycolic acid), polycaprolactone, and combinations thereof.

In some embodiments of the method for evaluating the potential for a tumor cell to metastasize from a first tissue to a second tissue, the first and second 3D scaffold comprises varying ratios of the natural and synthetic polymers.

In some embodiments of the method for evaluating the potential for a tumor cell to metastasize from a first tissue to a second tissue, the first and second 3D scaffold comprises a co-spun 3D scaffold with varying ratios of the natural and synthetic polymers, a physical mixture of co-spun 3D scaffolds with varying ratios of the natural and synthetic polymers, and/or a combination thereof. In some embodiments, the first and second 3D scaffold comprises a decellularized extracellular matrix composition from one or more tissues selected from the group consisting such as bone, cartilage, muscles, fat, brain, liver, spleen, lymph node, and lung. In some embodiments, the first and second 3D scaffold comprises components mimicking minerals in native extracellular matrix including hydroxyapatite nanoparticles, hydroxyapatite microparticles, tricalcium phosphate nanoparticles, tricalcium phosphate microparticles. In some embodiments, the first and second 3D scaffold comprises collagen sponge, poly(ethylene glycol) hydrogels, polyester based scaffolds comprise of poly(lactic-co-glycolic acid), poly(lactic acid), poly(glycolic acid), polycaprolactone, and/or combinations thereof. In some embodiments, the first and second 3D scaffold comprises one or more of poly(ethylene glycol) with minerals, poly(lactic-co-glycolic acid) with minerals, poly(lactic acid) with minerals, poly(glycolic acid) with minerals, polycaprolactone with minerals, 3D scaffold coated with hydroxyapatite- or tricalcium phosphate-based minerals, and/or combinations thereof. In some embodiments, the cells of the second 3D scaffold are obtained from the subject. In some embodiments, the tumor cells are breast cancer cells. In some embodiments, the cells in the second scaffold are bone cells. In some embodiments, the evaluation of infiltration is determined using fluorescence microscopy. In some embodiments, the method further comprising calculating a value for the degree of infiltration of the tumor cells and comparing that value to a value for a degree of infiltration of a known aggressive cell line. In some embodiments, the method comprises further evaluating the efficacy of one more anti-cancer therapeutics on preventing the infiltration of the tumor cells into the second 3D scaffold. In some embodiments, the subject is human.

In some embodiments of the method for evaluating the potential for a tumor cell to metastasize from a first tissue to a second tissue, the first and second 3D scaffolds interface with each other such that the second 3D scaffold is, without limitations, concentric with, adjacent to, completely surrounded by, partially surrounded by, dispersed within, interspersed within, overlays, and/or overlaid with the first 3D scaffold.

In some embodiments, a method for evaluating the potential for breast cancer cells to metastasize into a tissue engineered bone comprises providing a first 3D scaffold comprising a plurality of breast cancer cells labeled with a first fluorescent label, and providing a second 3D scaffold comprising a tissue engineered bone comprising a plurality of hMSC-derived osteoblasts or primary bone resident cells labeled with a second fluorescent label and a bone matrix, the first and second 3D scaffolds comprises gelatin 3D scaffold with hydroxyapatite simultaneously co-culturing in a medium the plurality of breast cancer cells and the tissue engineered bone comprising a plurality of hMSC-derived osteoblasts or primary bone resident cells and a bone matrix, determining a degree of metastasis, and a speed of metastasis of the breast cancer cells from the first scaffold to the second 3D scaffold comprising the tissue engineered bone by fluorescence imaging based on the first and second fluorescent labels.

In some embodiments, a system for evaluating the potential for a tumor cell to metastasize from a first tissue to a second tissue comprises a first 3D scaffold configured to receive a plurality of tumor/cancer cells from the first tissue, a second 3D scaffold configured to receive a plurality of cells from the second tissue of potential metastasis, and a media suitable for simultaneous co-culture of the plurality of tumor/cancer cells from the first tissue received in the first 3D scaffold and the plurality of cells from the second tissue of potential metastasis received in the second 3D scaffold. In some embodiments, the first and second 3D scaffold comprises a natural polymers selected from the group consisting of gelatin, glycosaminoglycans, hyaluronic acid, chondroitin sulfate, heparin sulfate, and, combinations thereof. In some embodiments, the first and second 3D scaffold comprises a synthetic polymer selected from the group consisting of poly(ethylene glycol), poly(lactic-co-glycolic acid), poly(lactic acid), poly(glycolic acid), polycaprolactone, and combinations thereof.

In some embodiments of the system for evaluating the potential for a tumor cell to metastasize from a first tissue to a second tissue, the first and second 3D scaffold comprises varying ratios of the natural and synthetic polymers.

In some embodiments of the system for evaluating the potential for a tumor cell to metastasize from a first tissue to a second tissue, the first and second 3D scaffold comprises a co-spun 3D scaffold with varying ratios of the natural and synthetic polymers, a physical mixture of co-spun 3D scaffold with varying ratios of the natural and synthetic polymers, and/or a combination thereof. In some embodiments, the first and second 3D scaffold comprises a decellularized extracellular matrix composition from one or more tissues selected from the group consisting such as bone, cartilage, muscles, fat, brain, liver, spleen, lymph node, and lung. In some embodiments, the first and second 3D scaffold comprises components mimicking minerals in native extracellular matrix including hydroxyapatite nanoparticles, hydroxyapatite microparticles, tricalcium phosphate nanoparticles, tricalcium phosphate microparticles. In some embodiments, the first and second 3D scaffold comprises collagen sponge, poly(ethylene glycol) hydrogels, polyester based scaffolds comprise of poly(lactic-co-glycolic acid), poly(lactic acid), poly(glycolic acid), polycaprolactone, and/or combinations thereof. In some embodiments, the first and second 3D scaffold comprises one or more of poly(ethylene glycol) with minerals, poly(lactic-co-glycolic acid) with minerals, poly(lactic acid) with minerals, poly(glycolic acid) with minerals, polycaprolactone with minerals, 3D scaffold coated with hydroxyapatite- or tricalcium phosphate-based minerals, and/or combinations thereof. In some embodiments, the system is further configured to measure one or more secondary effects of metastasis tumor/cancer cells from the first tissue to the second tissue of potential metastasis on target tissues. In some embodiments, the one or more secondary effects include bone resorption, changes in cell signaling, cytokine production, gene expression profiles, protein expression, metabolism, tissue structure, matrix compositions, and interaction with other tissues/organs.

In some embodiments, a system for evaluating the potential for a tumor cell to metastasize from a first tissue to a second tissue, the first and second 3D scaffolds interface with each other such that the second 3D scaffold is, without limitations, concentric with, adjacent to, completely surrounded by, partially surrounded by, dispersed within, interspersed within, overlays, and/or overlaid with the first 3D scaffold.

In some embodiments, a system for evaluating the potential for breast cancer cells to metastasize into a tissue engineered bone comprises a first 3D scaffold comprising a plurality of breast cancer cells labeled with a first fluorescent label, and a second 3D scaffold comprising a tissue engineered bone comprising a plurality of hMSC-derived osteoblasts labeled with a second fluorescent label and a bone matrix, wherein the first and second 3D scaffolds comprises gelatin 3D scaffold with hyaluronic acid, a medium suitable for simultaneous co-culture of the plurality of breast cancer cells and the tissue engineered bone comprising a plurality of hMSC-derived osteoblasts and a bone matrix, wherein the potential for breast cancer cells to metastasize into a tissue engineered bone is evaluated using fluorescence imaging based on the first and second fluorescent labels.

In some embodiments, any of the spatially-patterned 3D co-culture model, methods, or systems herein is for an assessment of chemokine product and/or modulation of chemokine production by the target tissue, the tissue of potential metastasis, or the tissue engineered bone.

In some embodiments, any of the spatially-patterned 3D co-culture model, methods, or systems herein further comprises at least one additional cell type.

In some embodiments of any of the spatially-patterned 3D co-culture model, methods, or systems herein, the at least one additional cell type is osteoclasts.

In some embodiments, any of the spatially-patterned 3D co-culture model, methods, or systems herein is for an assessment of an effect of a hormone.

In some embodiments of any of the spatially-patterned 3D co-culture model, methods, or systems herein, the assessment of an effect of a hormone comprises tumor/cancer-induced bone resorption.

In some embodiments of any of the spatially-patterned 3D co-culture model, methods, or systems herein, the hormone is parathyroid hormone.

In some embodiments of any one of the spatially patterned 3D co-culture models, methods, or systems herein, the first and/or second 3D scaffold comprises microribbons.

BRIEF DESCRIPTION OF THE DRAWINGS

FIG. 1(A) shows cross-section of a long bone illustrating geometry of compact bone surrounding the bone marrow space through which metastasizing cancer cells colonize the bones.

FIG. 1(B) shows histological evidence showing metastatic tumor cells (shown as "T") at the interface with bone tissue (shown as "B").

FIG. 1(C) shows fluorescence imaging demonstrating microribbon (μRB) scaffolds allow for spatially-patterning different cell types (red and green) in 3D to mimic breast cancer cells at the bone interface as observed in vivo. Scale bar=1 mm.

FIG. 1(D) shows schematic representation of spatially-patterned coculture in which human mesenchymal stem cells (hMSCs) are first encapsulated within a 3D macroporous, μRB scaffold and differentiated in vitro to create tissue engineered bone. The center of tissue engineered bone is then removed to mimic the bone marrow cavity space and cancer cells (e.g., breast cancer) that have been encapsulated in μRB scaffolds are introduced into the center to establish the 3D coculture of breast cancer cells at the interface with tissue engineered bone in vitro.

FIG. 3 shows fluorescence imaging of breast cancer cell (green) invasion at the coculture interface and demonstrates that tissue engineered bone (red—left panel), but not tissue engineered cartilage (red—middle panel) or muscle (red—right panel), induce breast cancer invasion, which recapitulates the in vivo findings that breast cancer cells preferentially metastasize to the bones. White arrows indicate selected and representative examples of invading cancer cells. Scale bar=200 μm.

FIG. 4(A) shows coculture model allows for independent evaluation of the respective components of bone in driving bone metastasis.

FIG. 4(B) shows breast cancer cell (green) invasion into tissue engineered bone (red—right panel) is higher than invasion into cocultures with the cellular component of bone (hMSC-derived osteoblasts) (red—left panel) and the bone matrix component (decellularized tissue engineered bone), suggesting that osteoblasts and bone matrix synergize to induce bone metastasis. White arrows indicate selected and representative examples of invading cancer cells. Scale bar=200 μm.

FIG. 5(A) shows fluorescence imaging of invasion of more aggressive breast cancer cells (MDA) and less aggressive breast cancer cells (MCF). White arrows indicate selected and representative examples of invading cancer cells. Scale bar=200 μm.

FIG. 5(B) shows quantification of cell invasion shows more aggressive breast cancer cells (MDA) invade more rapidly into bone than less aggressive breast cancer cells (MCF).

FIG. 5(C) shows quantification of breast cancer cell proliferation shows more aggressive breast cancer cells proliferate more rapidly in bone compared to less aggressive breast cancer cells.

FIGS. 6(A)-6(B) show recapitulation of breast cancer cell-induced decrease in bone mineral content using embodiments of the 3D culture model provided herein.

FIG. 6(A) shows micro-computed tomography (μCT) of spatially patterned 3D model of tissue engineered bone alone (−BrCa) and co-cultured with breast cancer cells (+BrCa).

FIG. 6(B) shows quantification of bone mineral density in 3D cocultures of tissue engineered bone with and without breast cancer cells (BrCa) demonstrate that breast cancer cells cause reduction in bone mineral content, which recapitulates in vivo findings.

FIGS. 7(A)-7(B) show recapitulation of PTH-induced inhibition of breast cancer metastasis to bone without impacting cancer cell proliferation using embodiments of the 3D culture model provided herein.

FIG. 7(A) shows fluorescence imaging shows that parathyroid hormone (PTH) treatment significantly reduces breast cancer cell invasion into tissue engineered bone. White arrows indicate selected and representative examples of invading cancer cells. Scale bar=200 μm.

FIG. 7(B) shows quantification of breast cancer cell proliferation using bioluminescence imaging shows PTH treatment does not impact breast cancer proliferation, which recapitulate previous in vivo findings.

FIGS. 8(A)-8(C) show recapitulation PTH-induced enhancement of osteoblast cell survival and bone mineralization using embodiments of the 3D culture model provided herein.

FIG. 8(A) shows quantification of osteoblast cell proliferation in 3D cocultures using bioluminescence imaging shows PTH treatment enhances osteoblast cell survival in the presence of breast cancer invasion.

FIG. 8(B) shows micro-computed tomography (μCT) imaging for bone mineralization with and without PTH treatment.

FIG. 8(C) shows quantification of bone mineral density demonstrates PTH treatment prevents breast cancer cell-induced reduction in bone mineralization.

FIGS. 9(A)-9(B) show recapitulation breast cancer cell induction of bone resorption, and level of bone resorption correlates with the level of aggressiveness of breast cancer cell line using embodiments of the 3D culture model provided herein.

FIG. 9(A) shows micro-computed tomography (μCT) of tissue engineered bone, breast cancer, and preosteoclast tri-cultures. Scale bar=1 mm.

FIG. 9(B) quantification of bone resorption demonstrates that breast cancer cells MDA and MCF) induce resorption of tissue engineered bone and the level of bone resorption is predictive of the aggressiveness of the breast cancer cells, whereby more aggressive breast cancer cells (MDA) induce greater bone resorption than less aggressive breast cancer cells (MCF).

FIG. 12(A) shows protein array of chemokines produced by tissue engineered bone and tissue engineered cartilage cultured alone (−MDA) or with breast cancer cells (+MDA) using 3D co-culture.

FIG. 12(B) shows quantification of chemokines.

FIG. 13(A) shows a schematic representation of tri-culture model containing osteoblasts, osteoclasts, and breast cancer cells.

FIG. 13(B) shows visualization of changes of bone mineralization over 14 days in breast cancer/bone tri-culture model using micro-computed tomography (μCT).

FIG. 13(C) shows quantification of bone loss demonstrates that only intermittent PTH treatment can reduce breast cancer-induced bone resorption.

DETAILED DESCRIPTION

Figure 1A:
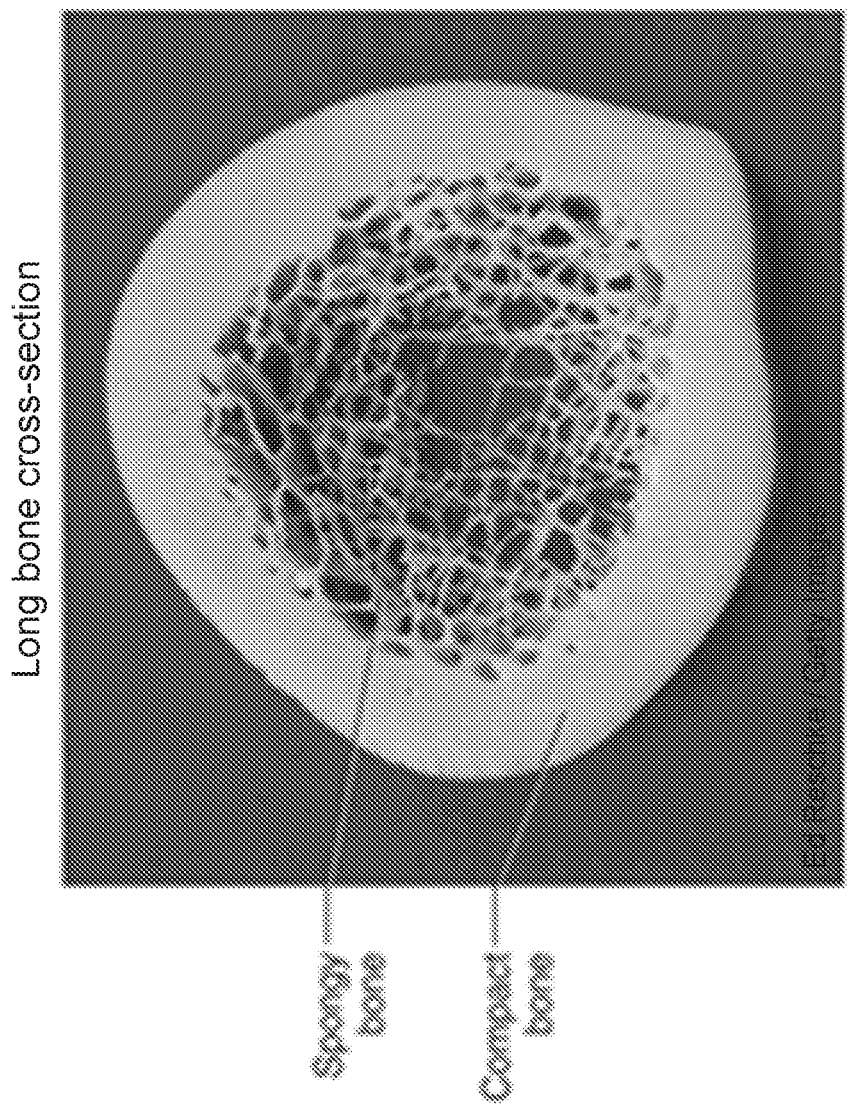
FIGS. 1(A)-1(D) show spatially-patterned microribbon (μRB) scaffolds to mimic breast cancer cells at the bone tissue interface showing metastatic breast cancer cells colonize the bones by invading in through the bone marrow space.
Figure 1B:
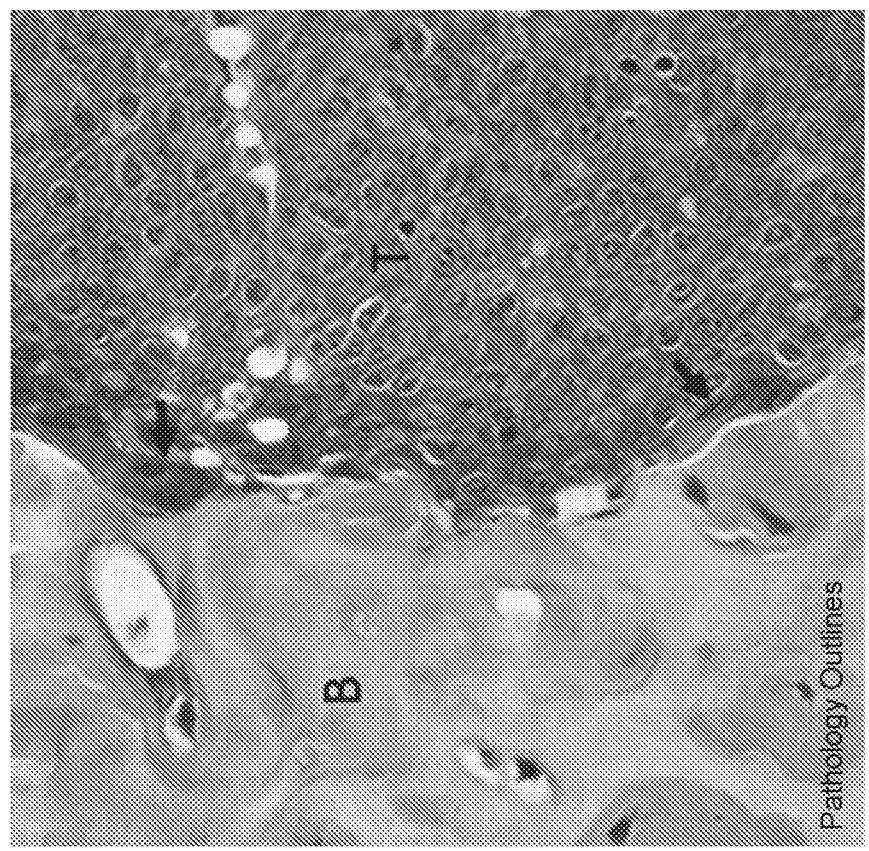

Several embodiments of the present disclosure are related to engineered tissue models based on three-dimensional (3D) scaffolds, also referred to herein as tissue-engineered 3D models, that can be used as in vitro diagnostic and drug screening tools for predicting, preventing and/or treating cancer metastases. Some embodiments of the present disclosure are related to tissue engineered 3D models of cancer metastasis using spatially patterned cancer cells and tissue-specific cells in 3D scaffolds.

A growing body of scientific evidence has highlighted the critical role of the 3D tissue microenvironment in modulating tumor progression and responses to therapy. Tissue engineered in vitro cancer models utilized biomaterials to grow cancer cells in 3D, and have been shown to lead to more physiologically relevant drug responses to in vivo that cannot be achieved using conventional 2D culture. While more progress has been made with modeling cancer cells in 3D, there remains a lack of 3D in vitro models that can serve as diagnostic tools to help predict the likelihood of a cancer patient developing metastasis towards specific target tissue types, the aggressiveness of the potential metastasis in vivo, and/or screening drug responses with physiological relevance.

Thus, there is an unmet need for screening tools for predicting and treating cancer metastases.

In order to address the above critical unmet needs, and more generally to allow an enhanced understanding of cancer metastases (and develop effective therapies) several embodiments disclosed herein relate to tissue-engineered 3D co-culture models as in vitro diagnostic and/or drug screening tools for predicting and/or treating cancer metastasis. In several embodiments, the model involves spatially patterning cancer cells and engineered tissues in 3D scaffolds (e.g., 3D macroporous, μRB scaffolds) with an interface between the spatially patterned cancer cells and engineered tissues. For example, as shown in FIGS. 1(A)-1(D), the spatially patterned cancer cells and engineered tissues interface in the form of concentric circles. In the embodiment of the model shown in FIGS. 1(A)-1(D), the engineered tissue (e.g., bone) is present as an outer ring around a central circle/disc of cancer cells.

In some embodiments, a first 3D scaffold allows for engineering by spatial patterning of cancer tissues using cells from specific cancer types. In some embodiments, a single cell type from a single cancer is used. In some embodiments, multiple cell types from a single cancer are used. In some embodiments, multiple cell types from multiple cancers are used.

In some embodiments, a second 3D scaffold allows for engineering spatial patterning of target tissues based on cells from tissues that are targets of metastasis. In some embodiments, a single target cell type from a single target tissue is used. In some embodiments, multiple target cell types from a single target tissue are used. In some embodiments, multiple target cell types from multiple target tissues are used. In several embodiments, the second 3D scaffold is a different type of scaffold than the first 3D scaffold.

In some embodiments, the cells of the target tissue are labeled with one fluorescent label, whereas the tumor/cancer cells are labeled with a different fluorescent label, such that the migrations of the tumor/cancer cells to the target tissue can be assessed by fluorescence imaging (e.g., using fluorescence microscopy, confocal microscopy, and the like) based on co-localization of the fluorescent labels in the tumor/cancer cells and the cells of the target tissue.

In some embodiments, the first and second 3D scaffolds are co-cultured with an interface to generate tissue-engineered 3D co-culture models that allow for investigating metastatic characteristics of the cancer cells and their invasive properties with respect to the target tissue. In some embodiments, the first and second 3D scaffolds can be in different shapes to mimic a tissue interface of interest. Non-limiting examples include concentric rings, concentric squares, concentric rectangles, bi-layers, tri-layers, multi-layers, sandwich, and/or combinations thereof.

In some embodiments, the model can be used as an in vitro diagnostic tool for determining whether or not a tumor/cancer cell has metastatic characteristics, and their invasive properties with respect to one or more target tissues. For example, cells collected from a tumor/cancer biopsy can be assessed for their metastatic characteristics and invasive properties with respect to one or more target tissues. In some embodiments, the cells collected from a tumor/cancer biopsy comprise a homogeneous population of cells. In some embodiments, the cells collected from a tumor/cancer biopsy comprise a heterogeneous population of cells.

In some embodiments, the model can be used to recapitulate tissue-specific cancer metastasis towards one target but not others that may be located nearby and/or distantly located.

Using breast cancer-bone metastasis as a non-limiting model system, experiments disclosed herein demonstrated that such spatially patterned in vitro models can recapitulate key aspects of in vivo breast cancer-bone metastasis, which cannot be achieved using the current state-of-the-art 2D models. Several embodiments relate to metastasis detection for other cancer types and/or tissue locations. For example, FIGS. 1(A)-1(D) show spatially patterned microribbon (RB) scaffold-based 3D co-culture model to mimic breast cancer cell-bone invasion at the bone marrow/long bone tissue interface. As described in Example 2, using the model shown in FIGS. 1(A)-1(D), it was demonstrated that tissue-engineered bone, but not undifferentiated hMSCs or acellular μRB scaffold, induces breast cancer cell invasion (FIG. 2). It was further shown that tissue engineered bone, but not tissue engineered cartilage or muscle, support breast cancer cell invasion (FIGS. 3(A)-3(B)). Likewise, in some embodiments, a scaffold of a first tissue is used to predict and/or study invasion of tumor cells from a different tissue, for example, a liver-tissue scaffold to predict and/or study invasion from a colon cancer.

In some embodiments, the 3D model enables recapitulating tissue-specific breast cancer metastasis towards bone, but not other tissues including cartilage and muscle. Using the model shown in FIGS. 1(A)-1(D), it was demonstrated that tissue engineered bone, but not tissue engineered cartilage or muscle, supported breast cancer cell invasion (FIGS. 3(A)-3(B)). Thus, in some embodiments tissue engineered bone can support breast cancer cell invasion, which recapitulates bone-specific breast cancer metastasis. In some embodiments tissue engineered bone can induce breast cancer cell invasion, which recapitulates bone-specific breast cancer metastasis. In some embodiments, tissue engineered bone can induce and support breast cancer cell invasion, which recapitulates bone-specific breast cancer metastasis. In some embodiments, tissue engineered bone, but not other tissues (i.e. cartilage or muscle), can induce breast cancer cell invasion, which recapitulates bone-specific breast cancer metastasis. In some embodiments, tissue engineered bone, but not other tissues (i.e. cartilage or muscle), can support breast cancer cell invasion, which recapitulates bone-specific breast cancer metastasis. In some embodiments, tissue engineered bone, but not other tissues (i.e. cartilage or muscle), can induce and support breast cancer cell invasion, which recapitulates bone-specific breast cancer metastasis.

In some embodiments, the model can be used as a drug screening tool. For example, a high-throughput drug screen can be combined with the model to screen for small molecules that reduce, reduce the likelihood of, and/or prevent metastatic migration of the tumor/cancer cells.

In some embodiments, the model can be used for predicting metastatic aggressiveness of different cancer cell lines towards various target tissues. For example, in some embodiments, a cancer cell line may be more aggressive toward one type of target cell as compared to other types of target cells and/or tissues. In some embodiments, a cancer cell line may have the same metastatic aggressiveness towards all target cell lines. In some embodiments, the metastatic aggressiveness may be directly related to its proximity to a target cell. In some embodiments, the metastatic aggressiveness may be inversely related to its proximity to a target cell. In some embodiments, a more aggressive cancer (e.g., a more aggressive breast cancer cell line) shows faster invasion into a target tissue (e.g. a 3D scaffold engineered with bone tissue), whereas a less aggressive cancer cell line exhibits slower invasion into a target tissue.

Figure 5A:
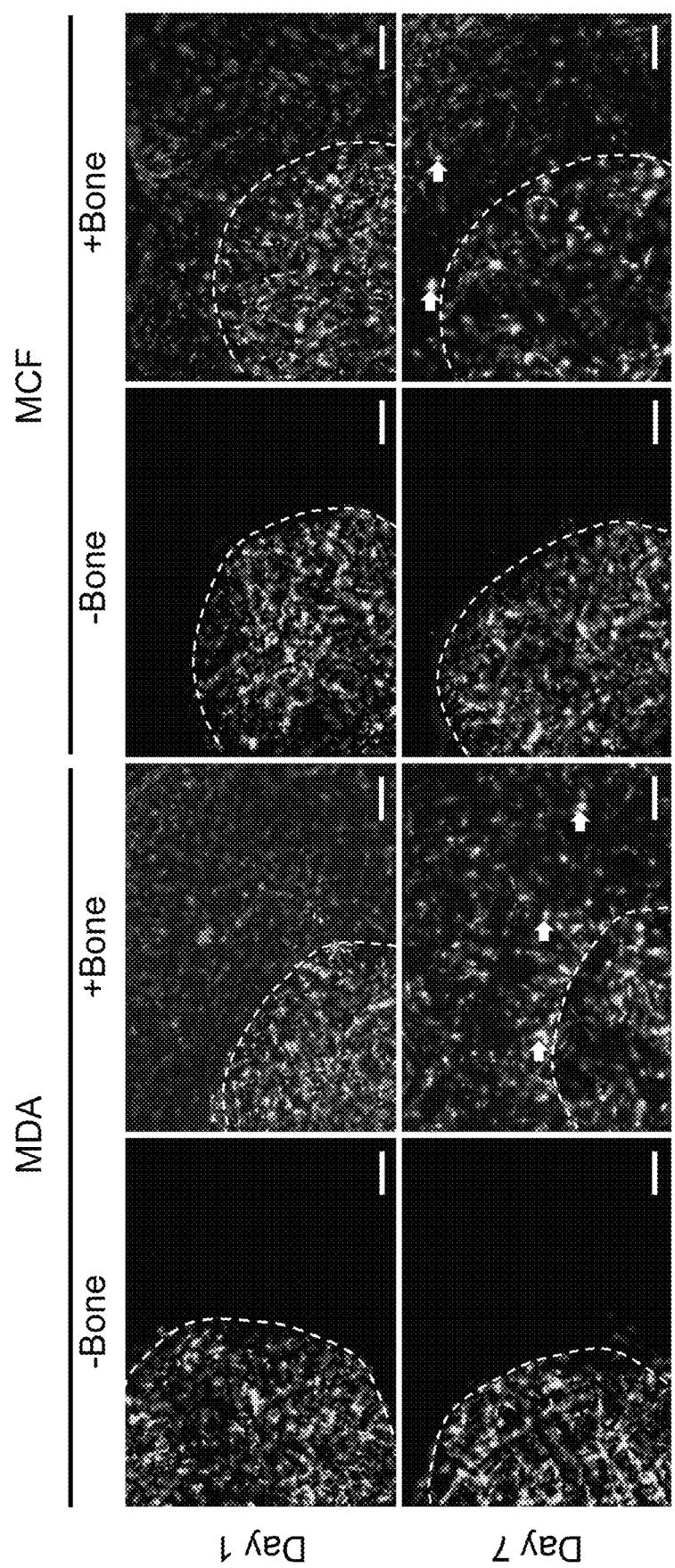
FIGS. 5(A)-5(C) show 3D coculture model allows for the recapitulation of varying speeds of invasion into bone, allowing the prediction of breast cancer cell aggressiveness.
Figure 5B:
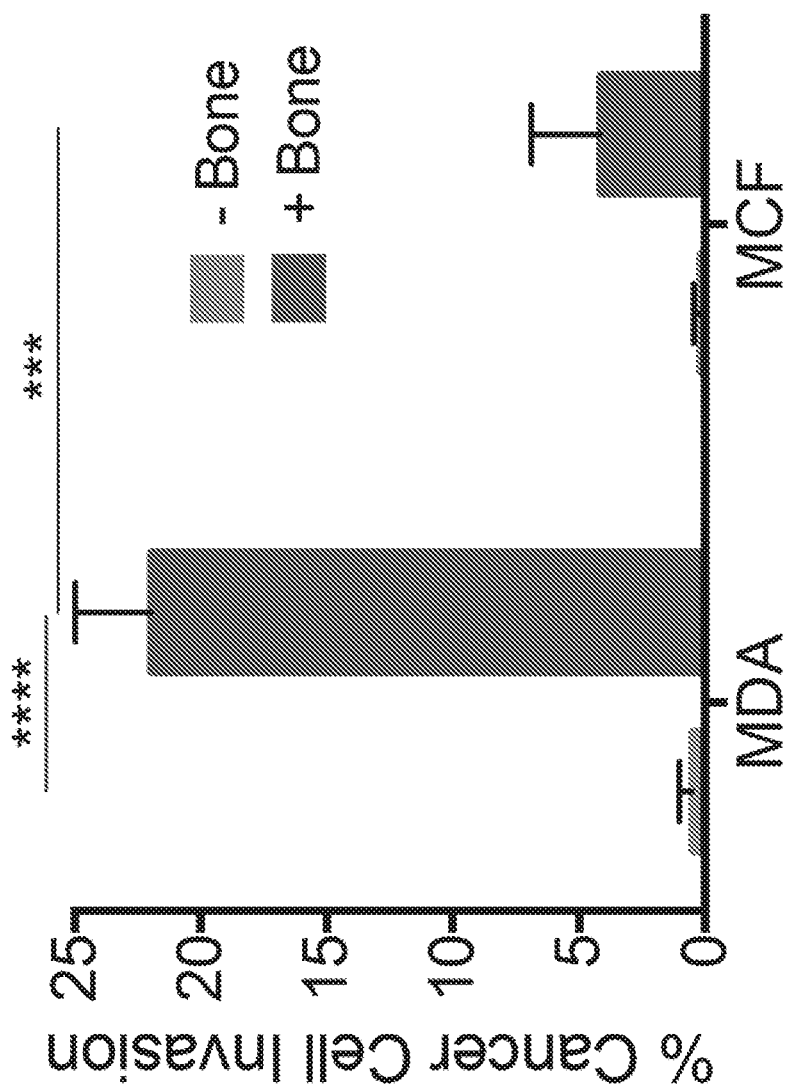
Figure 5C:
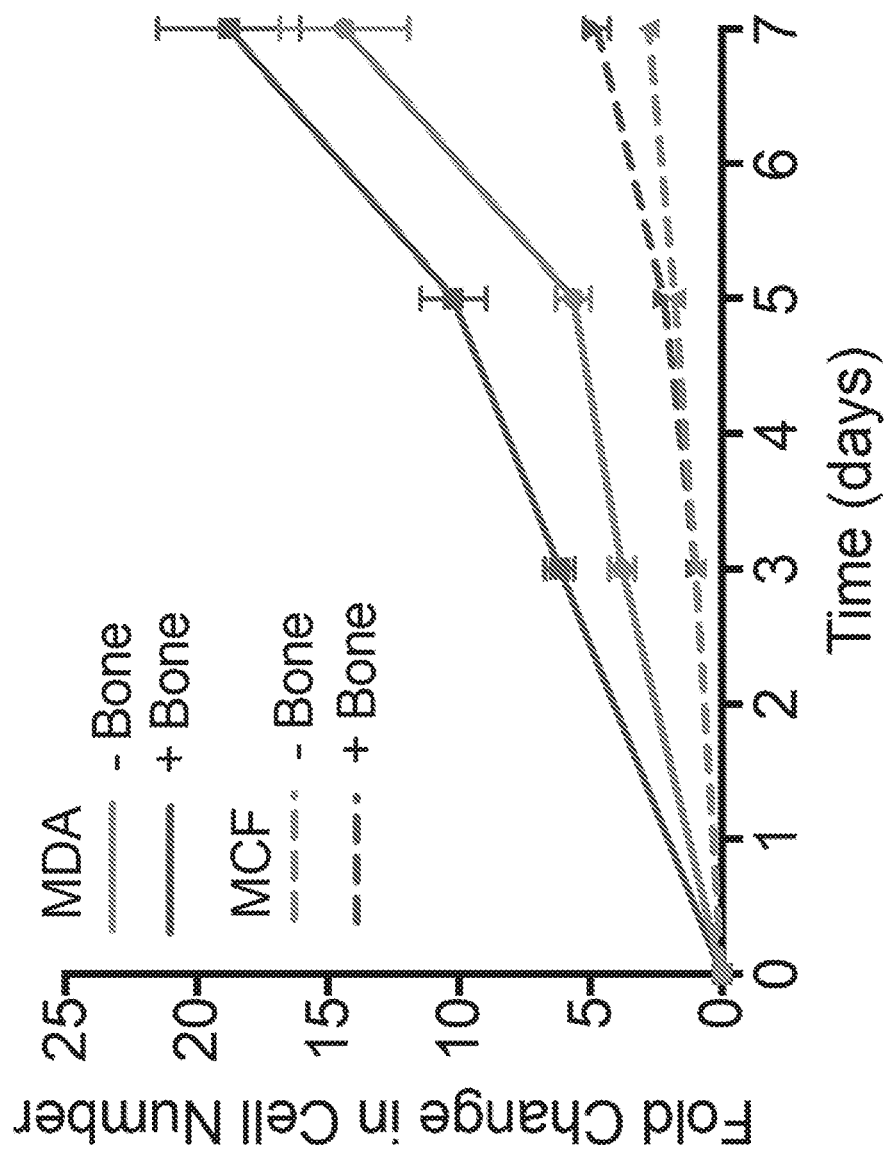

For example, data in FIGS. 5(A)-5(C) show that an embodiment of the 3D coculture model described herein allows for the prediction of breast cancer cell aggressiveness and rate of metastasis to bone. Using the model shown in FIGS. 1(A)-1(D), it was demonstrated that a more aggressive breast cancer cells (MDA) showed faster and greater invasion into engineered bone tissue as compared to the less aggressive breast cancer cells (MCF) (FIGS. 5(A)-5(C)). No invasion was observed with either cells in the absence of engineered bone tissue (FIGS. 5(A)-5(C)).

Thus, in some embodiments, the model can be used to predict the aggressiveness of different cancer cells (e.g., breast cancer cell lines) to a target tissues (e.g., bone): more aggressive breast cancer cell lines correlated with faster invasion into tissue engineered bone, whereas less aggressive breast cancer cell lines exhibited slower bone invasion (FIG. 5(A)-5(C)). In several embodiments, cancer cells (e.g., from a patient) are assessed for their invasive potential. In several embodiments, a tumor/cancer biopsy samples from a patient collected during clinic testing and/or surgery can be sent to a designated laboratory, where the cells collected from the tumor/cancer sample can be tested for their metastatic propensity using embodiments of the model disclosed herein, thus enabling earlier detection of potential metastasis.

In some embodiments, the model can be provided as a kit. A tumor/cancer biopsy obtained from a patient during clinic testing and/or surgery can be processed to segregate the various cell types in the tumor/caner biopsy. Each of the different cell types from the tumor/cancer can be tested for their metastatic characteristics towards different types of target tissues according to some embodiments of the model disclosed herein. In some embodiments, each of the different cell types from the tumor/cancer or mixed cell populations isolated from tumor biopsy can be tested for their metastatic characteristics towards different types of tissues, and/or for their ability to interact with target tissues to induce further changes such as biochemical changes, metabolic changes, structural changes (e.g., tissue resorption), and the like.

In some embodiments, based on an assessment of the invasive potential in the in vitro 3D model disclosed herein of cancer cells from a patient, the in vivo migration potential of the cancer cells can be predicted. In some embodiments, the information on the migration potential of the cancer cells can be used to develop patient-specific treatment options to prevent and/or treat cancer metastasis.

In some embodiments, the model can be used to assess one or more secondary effects of metastasis, and the one or more secondary effects can be used to predict the relative aggressiveness of different cancer cell lines. For example, the model shown in FIGS. 1(A)-1(D) was used to recapitulate breast cancer cell induction of bone resorption and level of resorption to predict breast cancer cell aggressiveness (FIGS. 9(A)-9(B)). A more aggressive breast cancer cell (MDA) caused higher bone resorption as compared to a less aggressive breast cancer cell (MCF) caused lower bone resorption (FIGS. 9(A)-9(B)). Secondary effects/changes can occur in the metastasized tumor/cancer cells relative to non-metastasized tumor/cancer cells, cells of the target tissue, or both. Secondary changes include, without limitations, changes in signaling, morphological changes, biochemical changes, physiological changes, metabolic changes, and biophysical changes in the structure and/or functions of the target tissues and/or the metastasized tumor/cancer cells relative to non-metastasized tumor/cancer cells, changes in the interaction of the target tissue and/or the metastasized tumor/cancer cells relative to non-metastasized tumor/cancer cells with other tissues/organs, changes in the type or amount of matrix compositions, changes in matrix stiffness, changes in cytokines produced by cancer cells or tissue resident cells, changes in gene expression profiles, and the like.

In some embodiments, assessment of additional parameters can be performed. For example, in some embodiments, the model allows for recapitulation of breast cancer invasion into bone tissues induced-reduction of bone mineral density and bone resorption. Using the model shown in FIGS. 1(A)-1(D), it was demonstrated that one embodiments of the 3D coculture model recapitulated breast cancer cell invasion-induced decrease in mineral content (FIG. 6(A)-6(B)). Thus, in some embodiments, the model can recapitulate breast cancer invasion into bone tissues induced reduction of bone mineral density and bone resorption (FIG. 9(A)-9(B)).

Figure 7A:
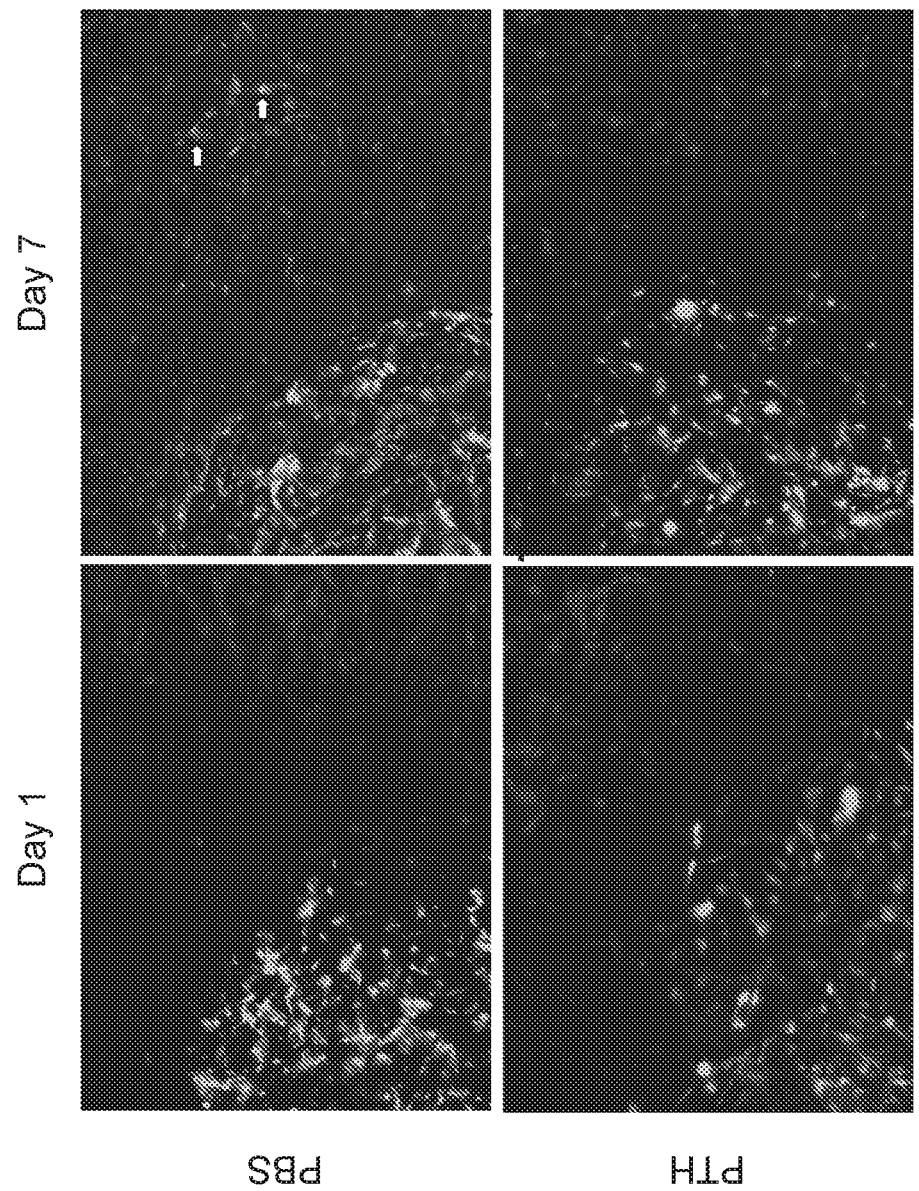

In some embodiments, the model allows to recapitulate the effect of drugs that reduce breast cancer-bone metastasis. For example, it was demonstrated using the model shown in FIGS. 1(A)-1(D) that drugs that reduce breast cancer-bone metastasis in vivo also resulted in reduced breast cancer invasion in the tissue engineered co-culture model disclosed herein. PTH has been shown to specifically reduce breast cancer cell-bone metastasis in mouse models. Data in FIGS. 7(A)-7(B) show that 3D co-culture model allows recapitulation of PTH-induced inhibition of breast cancer metastasis to bone without stimulation and/or impacting cancer cell proliferation (i.e., the cancer cells were capable of proliferating).

Thus, in some embodiments, the model can recapitulate in vitro the effect of drugs that reduce metastasis in vivo. For example, PTH that reduces breast cancer-bone metastasis in vivo also reduced breast cancer invasion using the tissue engineered co-culture model described herein (FIGS. 7(A)-7(B)).

In some embodiments, the model can recapitulate in vitro the effect of drugs that enhance target cell survival and ensuing effects of enhanced target cell survival. For example, using the model shown in FIGS. 1(A)-1(D), PTH-induced enhancement of osteoblast cell survival and bone mineralization was recapitulated (FIGS. 8(A)-8(C)).

In some embodiments, provided herein is a spatially patterned 3D co-culture model of cancer cells and target tissues. In some embodiments, the spatially patterned 3D co-culture model can serve as an in vitro diagnostic tool to predict the likelihood and aggressiveness of cancer metastasis towards specific target tissue types.

In some embodiments, the spatially patterned 3D co-culture model can facilitate drug screening and personalized treatment using patient-specific cells. In some embodiments, in order to mimic cancer metastasis at the tissue interface, the model comprises up of two (or more) concentric rings, an outer ring and an inner ring. As discussed in more detail herein, other shapes may also be used, in order to recapitulate or otherwise mimic the 3D microenvironment where potential metastases could arise. Non-limiting examples of other shapes include concentric rings, concentric squares, concentric rectangles, bi-layers, tri-layers, multi-layers, sandwich, and/or combinations thereof.

In some embodiments, the outer ring is composed of cells seeded or encapsulated in a first 3D scaffold resembling the tissues of potential metastasis target. Non-limiting examples include bones, cartilage, muscles, liver, lung, pancreas, brain, spleen, kidney, prostate, lymph nodes, bones, and the like, including any tissue that is known in the art to be a target of metastasis and/or susceptible to metastasis, and/or can be a target of metastasis.

In some embodiments, the inner ring is composed of cancer cells seeded or encapsulated in a second 3D scaffold. By measuring the degree/potential and speed of cancer cell migration towards the outer ring, the model allows prediction of the potential and speed of the cancer cells for metastasizing into the target tissue. In some embodiments, the model allows for predicting the potential/degree migration of the cancer cells into the target tissue. In some embodiments, the model allows for predicting the speed of migration of the cancer cells into the target tissue. In some embodiments, the model allows for predicting the potential/degree and speed of migration of the cancer cells into the target tissue.

In some embodiments, the inner ring is composed of cells seeded or encapsulated in a first 3D scaffold resembling the tissues of potential metastasis target. Non-limiting examples include bones, cartilage, muscles, liver, lung, pancreas, brain, spleen, kidney, prostate, and the like.

In some embodiments, the outer ring is composed of cancer cells seeded or encapsulated in a second 3D scaffold. By measuring the degree/potential and speed of cancer cell migration towards the inner ring, the model allows prediction of the potential and speed of the cancer cells for metastasizing into the target tissue. In some embodiments, the model allows for predicting the potential/degree migration of the cancer cells into the target tissue. In some embodiments, the model allows for predicting the speed of migration of the cancer cells into the target tissue. In some embodiments, the model allows for predicting the potential/degree and speed of migration of the cancer cells into the target tissue.

Non-limiting examples of cancers include breast adenocarcinoma, pancreatic adenocarcinoma, lung carcinoma, prostate cancer, glioblastoma multiform, hormone refractory prostate cancer, solid tumor malignancies such as colon carcinoma, non-small cell lung cancer (NSCLC), anaplastic astrocytoma, bladder carcinoma, sarcoma, ovarian carcinoma, rectal hemangiopericytoma, pancreatic carcinoma, advanced cancer, cancer of large bowel, stomach, pancreas, ovaries, melanoma pancreatic cancer, colon cancer, colorectal cancer, bladder cancer, hematological malignancies, squamous cell carcinomas, breast cancer, astrocytomas, pilocytic astrocytoma, diffuse astrocytoma, anaplastic astrocytoma, and brain stem gliomas, glioblastomas, glioblastoma multiforme, meningioma, gliomas, ependymomas, oligodendrogliomas, and mixed gliomas, brain tumors, pituitary tumors, craniopharyngiomas, germ cell tumors, pineal region tumors, medulloblastomas, and primary CNS lymphomas.

In some embodiments, the model can be used as a model system using a specific cancer cell type to demonstrate that the spatially patterned 3D co-culture model can effectively predict metastasis into one or more specific target tissue types. For example, in some embodiments, using a breast cancer-bone metastasis as a model system, the inventors demonstrated that the spatially patterned 3D co-culture model effectively predicts bone-specific metastasis.

In some embodiments, the migration speed correlates with the level of aggressiveness of different cancer cells in patients. For example, in some embodiments, the inventors demonstrated that the spatially patterned 3D co-culture model effectively predicts bone-specific metastasis, and the migration speed correlates with the level of aggressiveness of different breast cancer cells in patients.

In some embodiments, the co-culture model recapitulates drug-induced inhibition of metastasis of one or more cancer types in vivo. For example, in some embodiments, the inventors have demonstrated that the co-culture model recapitulates drug-induced inhibition of breast cancer-bone metastasis in vivo.

In some embodiments, the co-culture model provides physiologically relevant, low cost in vitro tool for screening and discovering novel drug candidates.

In some embodiments, the co-culture model provides physiologically relevant, low cost in vitro tool for optimization of drug treatment plans using patient-specific cells.

In some embodiments, the co-culture model provides physiologically relevant, low cost in vitro tool for screening and discovering novel drug candidates, and optimization of drug treatment plans using patient-specific cells.

ADDITIONAL EMBODIMENTS

In some embodiments, engineered tissues can be derived using biomaterials of varying compositions. Non-limiting examples include the following one or more of which can be combined with each other.

In some embodiments, μRB scaffolds are made from natural polymers including a mixture of gelatin, glycosaminoglycans (hyaluronic acid, chondroitin sulfate or heparin sulfate), and/or physical mixture of μRBs of these compositions.

In some embodiments, synthetic μRBs are composed of poly(ethylene glycol), poly(lactic-co-glycolic acid), poly (lactic acid), poly(glycolic acid), polycaprolactone, and/or combinations thereof.

In some embodiments, μRBs coated with minerals including hydroxyapatite nanoparticles, hydroxyapatite microparticles, tricalcium phosphate nanoparticles, tricalcium phosphate microparticles, and/or combinations thereof.

In some embodiments, the size of the hydroxyapatite nanoparticles is <200 nm. In some embodiments, the size of the hydroxyapatite nanoparticles is <100 nm. In some embodiments, the size of the hydroxyapatite nanoparticles is <50 nm. In some embodiments, the size of the hydroxyapatite nanoparticles is <25 nm. In some embodiments, the size of the hydroxyapatite nanoparticles is <10 nm. In some embodiments, the size of the hydroxyapatite nanoparticles ranges from about 0.2 nm to about 200 nm.

In some embodiments, the size of the hydroxyapatite microparticles ranges from about 1 micron to about 20 microns. In some embodiments, the size of the hydroxyapatite microparticles ranges from about 1 micron to about 5 microns. In some embodiments, the size of the hydroxyapatite microparticles ranges from about 5 microns to about 10 microns. In some embodiments, the size of the hydroxyapatite microparticles ranges from about 10 microns to about 15 microns. In some embodiments, the size of the hydroxyapatite microparticles ranges from about 15 microns to about 20 microns.

In some embodiments, other shapes of nanostructures of apatite or mineral forms can be used as part of the scaffold. Non-limiting examples include nanospheres, nanocylinders, nanoplates, nanoshells, nanorods, nanorice, nanofibers, nanowires, nanopyramids, nanoprisms, nanostars, nanocrescents, nanorings, nanoantennas, and/or combinations thereof.

In some embodiments, macroporous scaffolds comprise collagen sponge, PLGA scaffolds, polycaprolactone scaffolds, and/or combinations thereof are used.

In some embodiments, hydrogels made from natural polymers and/or synthetic polymers provided herein are also contemplated. Non-limiting examples of hydrogels include homopolymer, copolymer, semi-interpenetrating network, interpenetrating network, and self-assembling peptide systems.

In some embodiments, the 3D scaffold used for spatial patterning can be either for fabricating the cancer tissue component (e.g., breast tissue), or for fabricating the target tissue type of cancer metastasis (e.g., bone). In some embodiments, the 3D scaffold can be for fabricating the cancer tissue component (e.g., breast tissue). In some embodiments, the 3D scaffold can be for fabricating the target tissue type of cancer metastasis (e.g., bone)

In some embodiments, the 3D scaffolds used for spatial patterning can be fabricated from single or combination forms of including the following: μRB scaffolds are made, according to several embodiments, from natural polymers including (but not limited to) gelatin, glycosaminoglycans (e.g., hyaluronic acid, chondroitin sulfate, heparin sulfate, and/or a combination thereof), co-spun μRBs with varying ratios of the above, physical mixture of μRBs of these compositions, and/or combinations thereof. μRBs are made, according to several embodiments, from decellularized extracellular matrix compositions from various tissues such as bone, cartilage, muscles, fat, lung, and the like.

Synthetic μRBs comprise, according to several embodiments, poly(ethylene glycol), poly(lactic-co-glycolic acid), poly(lactic acid), poly(glycolic acid), polycaprolactone, and/ or combinations thereof.

μRBs, according to several embodiments, are coated with minerals including hydroxyapatite nanoparticles, hydroxyapatite microparticles, tricalcium phosphate nanoparticles, tricalcium phosphate microparticles, and/or combinations thereof.

Macroporous scaffolds are also provided in several embodiments, and comprise various materials, including collagen sponge, poly(ethylene glycol), poly(lactic-co-glycolic acid), poly(lactic acid), poly(glycolic acid), polycaprolactone scaffolds, and any of these with minerals as listed above.

Hydrogels, in several embodiments, are made from decellularized extracellular matrix compositions, natural polymers (i.e. collagen, gelatin, glycoaminoglycans) or synthetic polymers (i.e., poly(ethylene glycol)) or their combinations.

Figure 10:
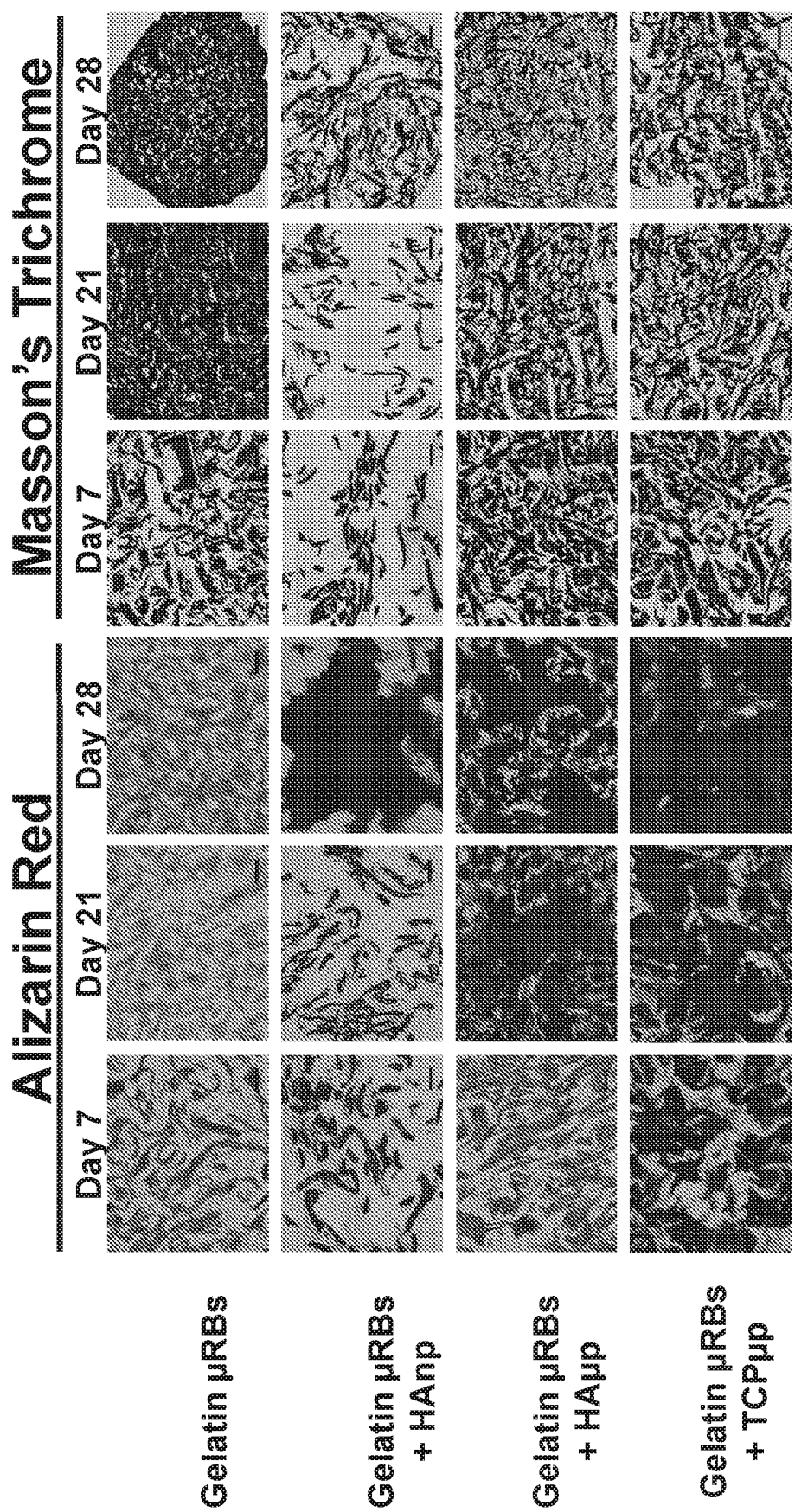
FIG. 10 shows Alizarin red staining for bone calcification confirms that μRB scaffolds coated with hydroxyapatite nanoparticles (HAnp) and microparticles (HAμp) or tricalcium phosphate microparticles (TCPμp) enhance bone mineral deposition in 3D. Masson's Trichrome for collagen matrix (blue) further confirms bone matrix formation in these scaffolds. Scale bar=50 μm.

In some embodiments, μRBs can be coated with hydroxyapatite- or tricalcium phosphate-based minerals (see, as a non-limiting embodiment, FIG. 10).

In some embodiments, histological evidence demonstrating matrix deposition in tissue engineered bone and/or cartilage can be assessed by histology by staining with dyes for features of bone and/cartilage. Non-limiting examples include, alizarin red staining for calcification to confirm formation of tissue engineered bone and safranin-O staining for glycosaminoglycans to confirm formation of tissue engineered cartilage.

Figure 11:
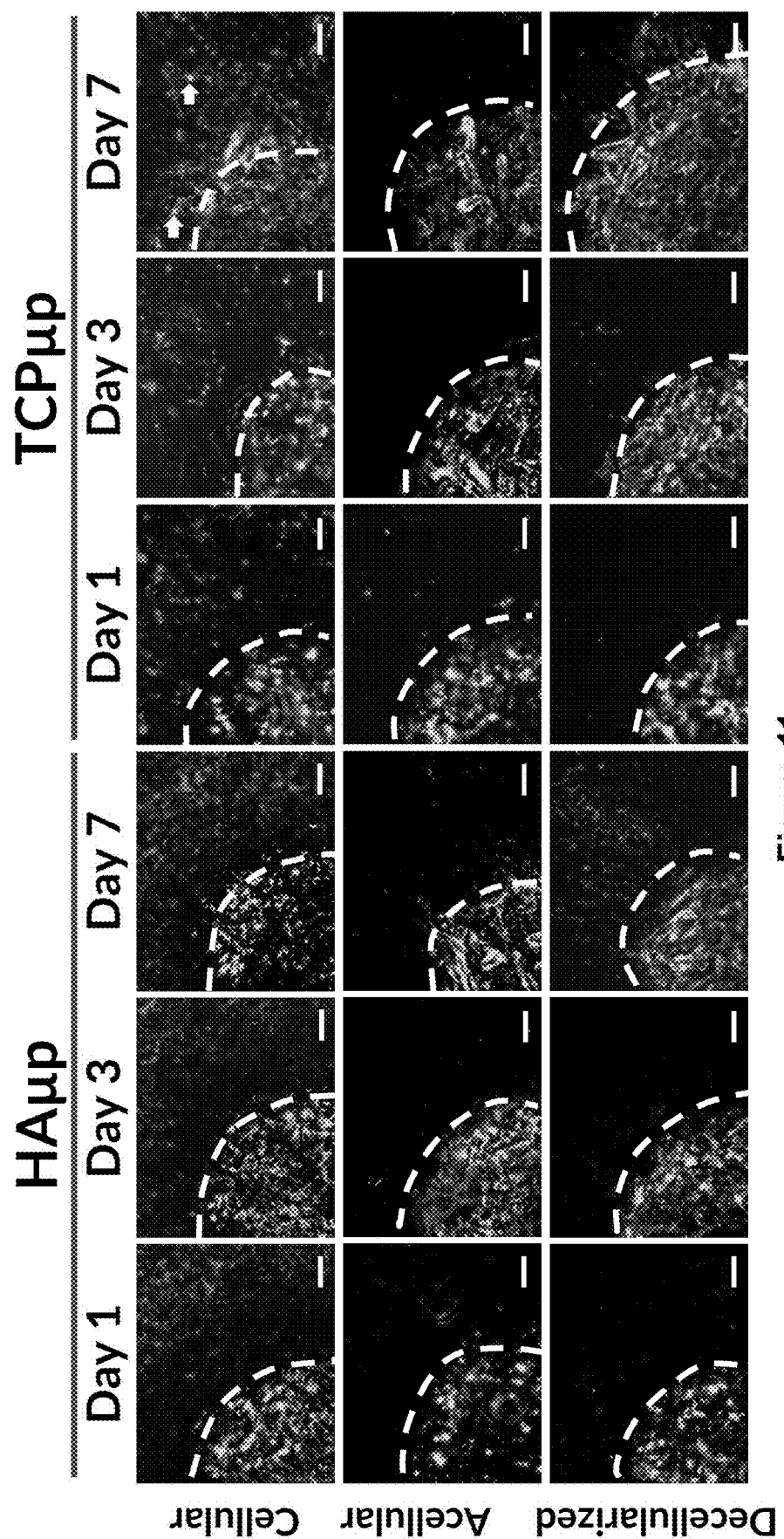
FIG. 11 shows fluorescence imaging comparing 3D coculture models using hydroxyapatite microparticles (HAμp) or tricalcium phosphate microparticles (TCPμp)-induced bone formation both support breast cancer cell (green) invasion. The models also allow for testing independent role of bone matrix (decellularized tissue engineered bone) and acellular gelatin μRBs containing HAμp or TCPμp on breast cancer cell invasion. White arrows indicate selected and representative examples of invading cancer cells. Scale bar=200 μm.

In some embodiments, tissue-engineered bone derived using hydroxyapatite and tricalcium phosphate-based minerals support breast cancer cell invasion (see, as a non-limiting embodiment, FIG. 11).

Non-limiting examples of other natural polymers include cellulose, chiton, carbohydrates, protein, DNA, RNA, and rubber, need to be included here in addition to synthetic polymers.

In some embodiments, the 3D scaffolds can be made of non-μRB scaffolds (e.g., collagen, gelatin, glycoaminoglycans) or synthetic polymers (i.e., poly(ethylene glycol)) or their combinations).

In some embodiments, the 3D scaffolds comprise gelatin μRBs with hyaluronic acid.

In some embodiments, embodiments of the 3D models disclosed herein allows for direct cell encapsulation and provides control over cell distribution, allowing for different cell types to be spatially patterned to mimic various tissue/cancer interfaces.

In some embodiments, spatial patterning can be performed using different shapes. In some embodiments, spatial patterning can be in different shapes to mimic a tissue interface of interest. Non-limiting examples include concentric rings, concentric squares, concentric rectangles, bi-layers, tri-layers, multi-layers, sandwich, and/or combinations thereof.

In some embodiments, the spatial patterning mimic a tissue interface of interest such as a tendon-bone interface, ligament-bone interface, cartilage-bone interface, muscle-bone interface, and/or combinations thereof.

In some embodiments, the spatial patterning mimic a tissue interface of interest such as a bone interface with one or more other tissues and/or a bone interface with one or more body fluids (e.g., synovial fluid).

In some embodiments, the various engineered target tissues can be used. Non-limiting examples include bone, cartilage, muscle, fat, liver, lung, etc.

In some embodiments (e.g., the 3D model of FIGS. 1(A)-1(D)), the outer ring can be used to encapsulate various engineered target tissues. Non-limiting examples include bone, cartilage, muscle, fat, liver, lung, etc.

In some embodiments, the various cancer types can be used. Non-limiting examples include breast cancer, prostate cancer, lung and bronchus cancer, colon and rectum cancer, melanoma of the skin, lymphoma, multiple myeloma, brain cancer, liver cancer, thyroid cancer, bone cancer, etc.

In some embodiments (e.g., the 3D model of FIGS. 1(A)-1(D)), the center can be provided with various cancer types. Non-limiting examples include breast cancer, prostate cancer, lung and bronchus cancer, colon and rectum cancer, melanoma of the skin, lymphoma, multiple myeloma, brain cancer, liver cancer, thyroid cancer, bone cancer, etc.

In some embodiments, additional cell types can be added to the co-culture models. Non-limiting examples include including tissue-specific resident cells, immune cells (including T cells, B cells, macrophages, monocytes, dendritic cells, and other peripheral blood mononuclear cells), bone marrow-derived mesenchymal stem cells, hematopoietic stem cells, endothelial cells, and pericytes. The model can be used to assess the effects of the migration on one or more these other cell types. For example, the effect of metastasis on cytokine sections, migration, differentiation, proliferation, etc. of one or more of the additional cell types can be assessed.

Applications

In some embodiments, the 3D model provides in vitro models for several applications.

In some embodiments, the 3D model can be used as an in vitro diagnostic tool to predict the likelihood and speed of patient-derived cancer cells to metastasize towards different tissue types in vivo or in patients.

In some embodiments, the 3D model can be used as an in vitro drug screening tool for testing novel drug candidates for preventing and/or treating cancer metastasis. In some embodiments, the 3D model can be used as an in vitro drug screening tool for testing novel drug candidates for preventing cancer metastasis. In some embodiments, the 3D model can be used as an in vitro drug screening tool for testing novel drug candidates for treating cancer metastasis. In some embodiments, potential drugs include, without limitations, immunotherapies, chemotherapies, antibody-based therapies, gene therapies, other small drug-based therapies targeting cancer metastasis, and/or combinations thereof.

Figure 4A:
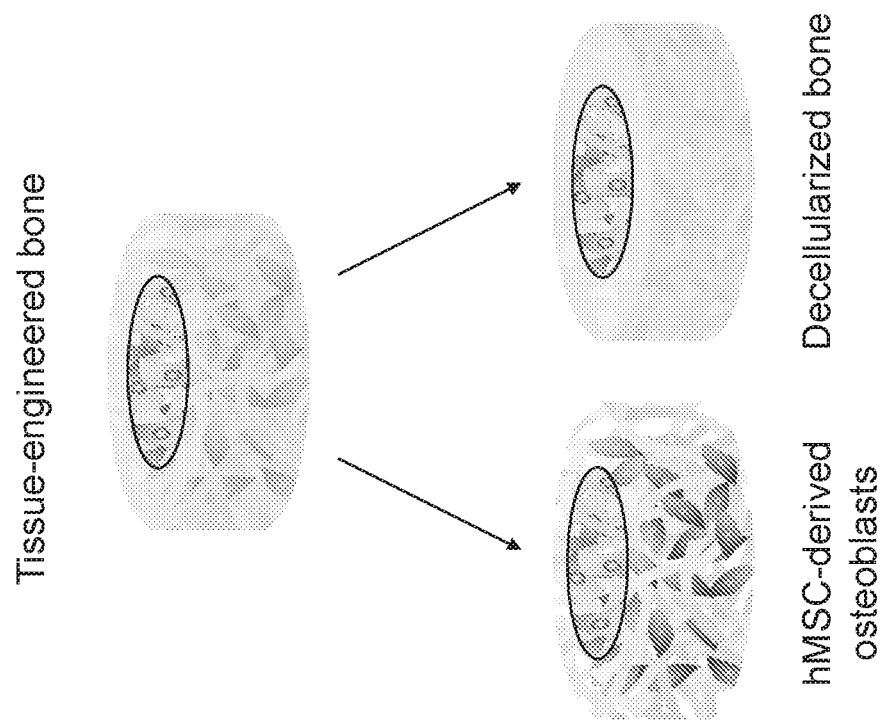
FIGS. 4(A)-4(B) show independent evaluation of the respective components of bone in driving bone metastasis using embodiments of the 3D coculture model provided herein.
Figure 4B:
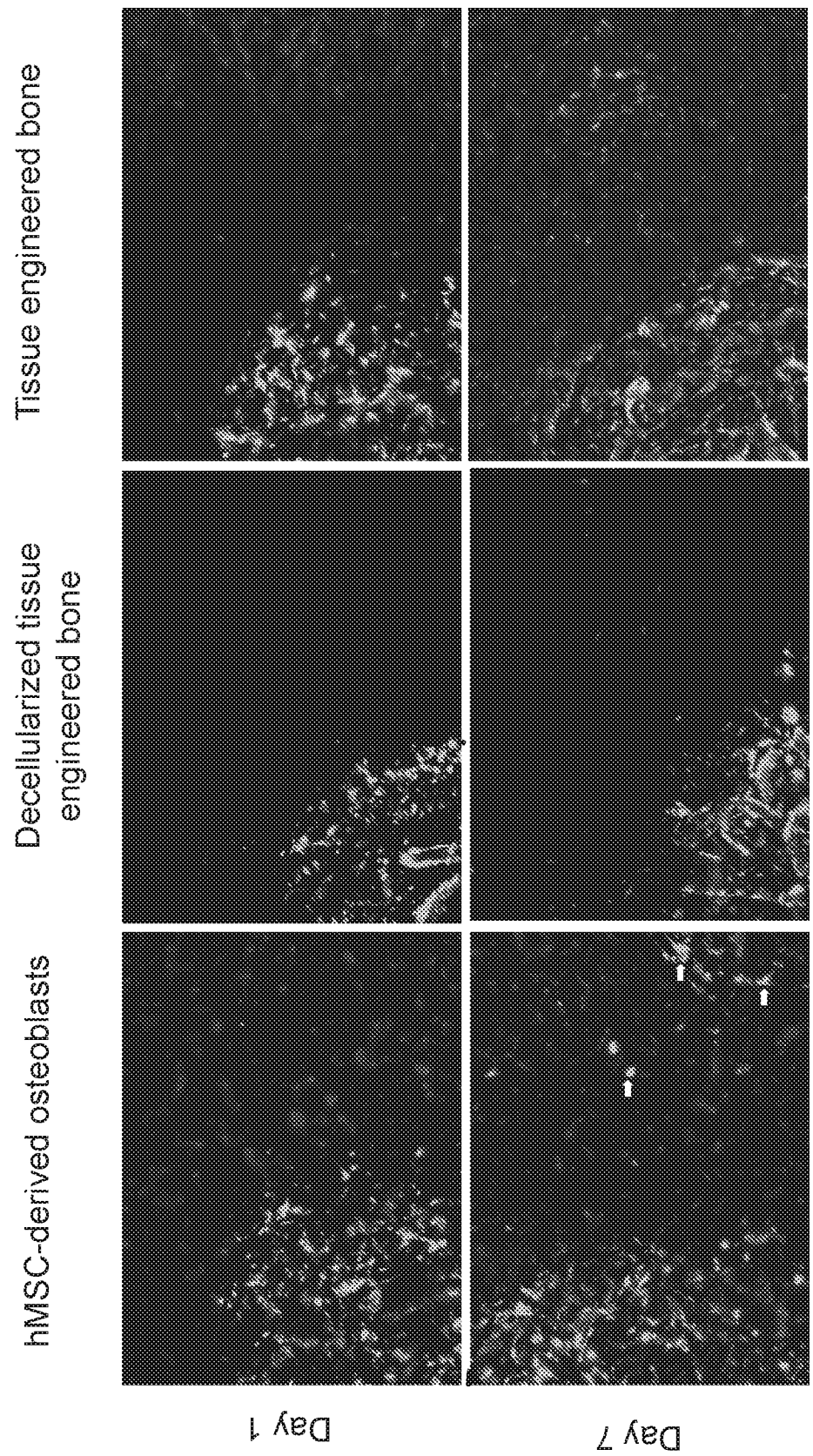

In some embodiments, the 3D model can be used as an in vitro experimental model for cancer metastasis-related mechanistic studies to elucidate the role of individual components in driving cancer metastasis. For examples, based on the coculture model for independent evaluation of the respective components of bone in driving bone metastasis (as shown in FIG. 4(A)), it was demonstrated that breast cancer cell invasion into tissue engineered bone is higher than invasion into cocultures with the cellular component of bone (hMSC-derived osteoblasts) or the decellularized bone matrix alone (decellularized tissue engineered bone), suggesting that osteoblasts and bone matrix synergize to induce bone metastasis (FIG. 4(B)).

In some embodiments, the 3D model can be used to assess the role of one or more of acellular extracellular matrix from target tissues, cell-cell interactions between cancer cells and tissue resident cells, tumor-vascular interactions, tumor-immune cell interactions, and/or interactions with the bone marrow/stem cell niche.

Advantages

In some embodiments, the model provides advantages and improvements over existing methods, devices, or materials.

Non-limiting examples of the advantages and improvements of several embodiments of the 3D model disclosed herein include, in some embodiments, providing a higher physiologically relevant model than a 2D culture model, and being much cheaper and high-throughput friendly than animal models. Another advantage of the tissue engineered cancer metastasis models over animal models is that animal models have all complex niche cues combined, and do not allow evaluating the respective contribution of individual niche cues in driving cancer metastasis. In contrast, embodiments of the tissue engineered cancer metastasis 3D models disclosed herein facilitate and enable evaluating individual niche cues and their respective contribution or synergy in driving cancer metastases. In some embodiments, the 3D model has highly tunable properties, for example, the 3D model provides control over scaffold porosity, biochemical properties, and biomechanical properties. In some embodiments, the 3D model can be used to generate multiple types of engineered tissue that can be spatially patterned.

In some embodiments, the 3D model allows for direct cell encapsulation and provides control over cell distribution. In some embodiments, the 3D model allows for different cell types to be spatially patterned to mimic various tissue/cancer interfaces. In some embodiments, the 3D model allows for direct cell encapsulation and provides control over cell distribution, and allows for different cell types to be spatially patterned to mimic various tissue/cancer interfaces. For examples, in the non-limiting model of FIGS. 1(A)-1(D), more than one type of target cells can be encapsulated in the μRBs. In some embodiments, the more than one type of target cells can be encapsulated homogeneously throughout the μRBs. In some embodiments, the more than one type of target cells can be encapsulated heterogeneously (e.g., in distinct domains) in the μRBs. Each of the more than one type of target cells can be labeled with a different fluorophore. Similarly, in some embodiments, more than one type of cancer cell can be in the model of FIGS. 1(A)-1(D), and each of the more than one type of can be labeled with a different fluorophore. Such a model with more than one type of target cell and more than one type of cancer cell would allow the assessment of propensity and/or aggressiveness of different cancers to various targets.

FURTHER EMBODIMENTS

In some embodiments, a spatially-patterned 3D co-culture model comprises a first 3D scaffold comprising a plurality of cells from a target tissue of potential metastasis, and a second 3D scaffold comprising a plurality of tumor cells/cancer cells. In some embodiments, the target tissue is selected from the group consisting of bone, cartilage, liver, lung, pancreas, brain, spleen, kidney, prostate, and muscle. In some embodiments, the tumor cells/cancer cells are obtained from a tumor/cancer selected from the group consisting of breast cancer, liver cancer, esophageal cancer, prostate cancer, lung cancer, brain cancer, adenocarcinoma, skin cancer, melanoma, and pancreatic cancer.

In some embodiments, the spatially-patterned 3D co-culture model is configured to assess a metastatic characteristics of the tumor cell/cancer cell towards the target tissue. In some embodiments, the metastatic characteristics are selected from the group consisting of degree of metastasis, and speed of metastasis. In some embodiments, the degree of metastasis is determined by the fraction of the cancer cells that have migrated from the second 3D scaffold to the first 3D scaffold.

In some embodiments of the spatially-patterned 3D co-culture model, the first and second 3D scaffold comprises a natural polymers selected from the group consisting of gelatin, glycosaminoglycans, hyaluronic acid, chondroitin sulfate, heparin sulfate, and, combinations thereof.

In some embodiments of the spatially-patterned 3D co-culture model, the first and second 3D scaffold comprises a synthetic polymer selected from the group consisting of poly(ethylene glycol), poly(lactic-co-glycolic acid), poly (lactic acid), poly(glycolic acid), polycaprolactone, and combinations thereof.

In some embodiments of the spatially patterned 3D co-culture model, the first and second 3D scaffold comprises varying ratios of the natural and synthetic polymers.

In some embodiments of the spatially-patterned 3D co-culture model, the first and second 3D scaffold comprises a co-spun 3D scaffold with varying ratios of the natural and synthetic polymers, a physical mixture of co-spun 3D scaffolds with varying ratios of the natural and synthetic polymers, and/or a combination thereof.

In some embodiments of the spatially-patterned 3D co-culture model, the first and second 3D scaffold comprises a decellularized extracellular matrix composition from one or more tissues selected from the group consisting such as bone, cartilage, muscles, fat, brain, liver, spleen, lymph node, and lung.

In some embodiments of the spatially-patterned 3D co-culture model, the first and second 3D scaffold comprises components mimicking minerals in native extracellular matrix including hydroxyapatite nanoparticles, hydroxyapatite microparticles, tricalcium phosphate nanoparticles, tricalcium phosphate microparticles.

In some embodiments of the spatially-patterned 3D co-culture model, the first and second 3D scaffolds interface with each other such that the second 3D scaffold is, without limitations, concentric with, adjacent to, completely surrounded by, partially surrounded by, dispersed within, interspersed within, overlays, and/or overlaid with the first 3D scaffold.

In some embodiments, a method of predicting cancer metastasis comprises providing a model, comprising a first 3D scaffold comprising a plurality of cells from a target tissue of potential metastasis, and a second 3D scaffold comprising a plurality of cells from a tumor/a cancer, determining a speed of migration and a degree of migration of the plurality of cells from the tumor/the cancer to the target tissue of potential metastasis.

In some embodiments, a method for evaluating the potential for a tumor cell to metastasize from a first tissue to a second tissue comprises obtaining a plurality of tumor/cancer cells from a subject, introducing at least a portion of the plurality of tumor/cancer cells into a first 3D scaffold, introducing the first 3D scaffold into a second 3D scaffold comprising a plurality of cells from a target tissue into which the tumor/cancer cells potentially metastasize, assembling the first and the second 3D scaffolds to generate a physical interface between the scaffolds that mimics an in vivo environment where a potential metastasis of the tumor/cancer cells could occur, co-culturing the assembled scaffolds for a period of time sufficient to allow a portion of the tumor/cancer cells in the first 3D scaffold to infiltrate the second 3D scaffold, and evaluating the degree of infiltration.

In some embodiments of the method for evaluating, the first and second 3D scaffold comprises a natural polymers selected from the group consisting of gelatin, glycosaminoglycans, hyaluronic acid, chondroitin sulfate, heparin sulfate, and, combinations thereof.

In some embodiments of the method for evaluating, the first and second 3D scaffold comprises a synthetic polymer selected from the group consisting of poly(ethylene glycol), poly(lactic-co-glycolic acid), poly(lactic acid), poly(glycolic acid), polycaprolactone, and combinations thereof.

In some embodiments of the method for evaluating the potential for a tumor cell to metastasize from a first tissue to a second tissue, the first and second 3D scaffold comprises varying ratios of the natural and synthetic polymers.

In some embodiments of the method for evaluating, the first and second 3D scaffold is a co-spun 3D scaffold with varying ratios of the natural and synthetic polymers, a physical mixture of co-spun 3D scaffolds with varying ratios of the natural and synthetic polymers, and/or a combination thereof.

In some embodiments of the method for evaluating, the first and second 3D scaffold comprises a decellularized extracellular matrix composition from one or more tissues selected from the group consisting such as bone, cartilage, muscles, fat, brain, liver, spleen, lymph node, and lung.

In some embodiments of the method for evaluating, the first and second 3D scaffold comprises components mimicking minerals in native extracellular matrix including hydroxyapatite nanoparticles, hydroxyapatite microparticles, tricalcium phosphate nanoparticles, tricalcium phosphate microparticles.

In some embodiments of the method for evaluating, the first and second 3D scaffold comprises collagen sponge, poly(ethylene glycol) hydrogels, polyester based scaffolds comprise of poly(lactic-co-glycolic acid), poly(lactic acid), poly(glycolic acid), polycaprolactone, and/or combinations thereof.

In some embodiments of the method for evaluating, the first and second 3D scaffold comprises one or more of poly(ethylene glycol) with minerals, poly(lactic-co-glycolic acid) with minerals, poly(lactic acid) with minerals, poly(glycolic acid) with minerals, polycaprolactone with minerals, 3D scaffold coated with hydroxyapatite- or tricalcium phosphate-based minerals, and/or combinations thereof.

In some embodiments of the method for evaluating, the cells of the second 3D scaffold are obtained from the subject.

In some embodiments of the method for evaluating, the tumor cells are breast cancer cells.

In some embodiments of the method for evaluating, the cells in the second scaffold are bone cells.

In some embodiments of the method for evaluating, the evaluation of infiltration is determined using fluorescence microscopy.

In some embodiments, the method for evaluating further comprising calculating a value for the degree of infiltration of the tumor cells and comparing that value to a value for a degree of infiltration of a known aggressive cell line.

In some embodiments, the method for evaluating comprises further evaluating the efficacy of one more anti-cancer therapeutics on preventing the infiltration of the tumor cells into the second 3D scaffold.

In some embodiments of the method for evaluating, the subject is human.

In some embodiments of the method for evaluating the potential for a tumor cell to metastasize from a first tissue to a second tissue, the first and second 3D scaffolds interface with each other such that the second 3D scaffold is, without limitations, concentric with, adjacent to, completely surrounded by, partially surrounded by, dispersed within, interspersed within, overlays, and/or overlaid with the first 3D scaffold.

In some embodiments, a method for evaluating the potential for breast cancer cells to metastasize into a tissue engineered bone comprises providing a first 3D scaffold comprising a plurality of breast cancer cells labeled with a first fluorescent label, and providing a second 3D scaffold comprising a tissue engineered bone comprising a plurality of hMSC-derived osteoblasts or primary bone resident cells labeled with a second fluorescent label and a bone matrix, the first and second 3D scaffolds comprises gelatin 3D scaffold with hydroxyapatite simultaneously co-culturing in a medium the plurality of breast cancer cells and the tissue engineered bone comprising a plurality of hMSC-derived osteoblasts or primary bone resident cells and a bone matrix, determining a degree of metastasis, and a speed of metastasis of the breast cancer cells from the first scaffold to the second 3D scaffold comprising the tissue engineered bone by fluorescence imaging based on the first and second fluorescent labels.

A system for evaluating the potential for a tumor cell to metastasize from a first tissue to a second tissue comprises a first 3D scaffold configured to receive a plurality of tumor/cancer cells from the first tissue, a second 3D scaffold configured to receive a plurality of cells from the second tissue of potential metastasis, and a media suitable for simultaneous co-culture of the plurality of tumor/cancer cells from the first tissue received in the first 3D scaffold and the plurality of cells from the second tissue of potential metastasis received in the second 3D scaffold.

In some embodiments of the system for evaluating, the first and second 3D scaffold comprises a natural polymers selected from the group consisting of gelatin, glycosaminoglycans, hyaluronic acid, chondroitin sulfate, heparin sulfate, and, combinations thereof.

In some embodiments of the system for evaluating, the first and second 3D scaffold comprises a synthetic polymer selected from the group consisting of poly(ethylene glycol), poly(lactic-co-glycolic acid), poly(lactic acid), poly(glycolic acid), polycaprolactone, and combinations thereof.

In some embodiments of the system for evaluating the potential for a tumor cell to metastasize from a first tissue to a second tissue, the first and second 3D scaffold comprises varying ratios of the natural and synthetic polymers.

In some embodiments of the system for evaluating, the first and second 3D scaffold comprises a co-spun 3D scaffold with varying ratios of the natural and synthetic polymers, a physical mixture of co-spun 3D scaffolds with varying ratios of the natural and synthetic polymers, and/or a combination thereof.

In some embodiments of the system for evaluating, the first and second 3D scaffold comprises a decellularized extracellular matrix composition from one or more tissues selected from the group consisting such as bone, cartilage, muscles, fat, brain, liver, spleen, lymph node, and lung.

In some embodiments of the system for evaluating, the first and second 3D scaffold comprises components mimicking minerals in native extracellular matrix including hydroxyapatite nanoparticles, hydroxyapatite microparticles, tricalcium phosphate nanoparticles, tricalcium phosphate microparticles.

In some embodiments of the system for evaluating, the first and second 3D scaffold comprises collagen sponge, poly(ethylene glycol) hydrogels, polyester based scaffolds comprise of poly(lactic-co-glycolic acid), poly(lactic acid), poly(glycolic acid), polycaprolactone, and/or combinations thereof.

In some embodiments of the system for evaluating, the first and second 3D scaffold comprises one or more of poly(ethylene glycol) with minerals, poly(lactic-co-glycolic acid) with minerals, poly(lactic acid) with minerals, poly(glycolic acid) with minerals, polycaprolactone with minerals, 3D scaffold coated with hydroxyapatite- or tricalcium phosphate-based minerals, and/or combinations thereof. The system of claim 16, wherein the system is further configured to measure one or more secondary effects of metastasis tumor/cancer cells from the first tissue to the second tissue of potential metastasis on target tissues.

In some embodiments of the system for evaluating, the one or more secondary effects include bone resorption, changes in cell signaling, cytokine production, gene expression profiles, protein expression, metabolism, tissue structure, matrix compositions, and interaction with other tissues/organs.

In some embodiments, a system for evaluating the potential for a tumor cell to metastasize from a first tissue to a second tissue, the first and second 3D scaffolds interface with each other such that the second 3D scaffold is, without limitations, concentric with, adjacent to, completely surrounded by, partially surrounded by, dispersed within, interspersed within, overlays, and/or overlaid with the first 3D scaffold.

In some embodiments, a system for evaluating the potential for breast cancer cells to metastasize into a tissue engineered bone comprises a first 3D scaffold comprising a plurality of breast cancer cells labeled with a first fluorescent label, and a second 3D scaffold comprising a tissue engineered bone comprising a plurality of hMSC-derived osteoblasts labeled with a second fluorescent label and a bone matrix, wherein the first and second 3D scaffolds comprises gelatin 3D scaffold with hyaluronic acid, a medium suitable for simultaneous co-culture of the plurality of breast cancer cells and the tissue engineered bone comprising a plurality of hMSC-derived osteoblasts and a bone matrix, wherein the potential for breast cancer cells to metastasize into a tissue engineered bone is evaluated using fluorescence imaging based on the first and second fluorescent labels. In some embodiments, the system further comprises at least one additional cell type. In some embodiment, the at least one additional cell type is osteoclasts.

In some embodiments, any of the spatially-patterned 3D co-culture model, methods, or systems herein is for an assessment of chemokine product and/or modulation of chemokine production by the target tissue, the tissue of potential metastasis, or the tissue engineered bone.

In some embodiments, any of the spatially-patterned 3D co-culture model, methods, or systems herein further comprises at least one additional cell type.

In some embodiments of any of the spatially-patterned 3D co-culture model, methods, or systems herein, the at least one additional cell type is osteoclasts.

In some embodiments, any of the spatially-patterned 3D co-culture model, methods, or systems herein is for an assessment of an effect of a hormone.

In some embodiments of any of the spatially-patterned 3D co-culture model, methods, or systems herein, the assessment of an effect of a hormone comprises tumor/cancer-induced bone resorption.

In some embodiments, a method for evaluating the potential for breast cancer cells to metastasize into a tissue engineered bone comprises providing a first 3D scaffold comprising a plurality of breast cancer cells labeled with a first fluorescent label, and providing a second 3D scaffold comprising a tissue engineered bone comprising a plurality of hMSC-derived osteoblasts or primary bone resident cells labeled with a second fluorescent label and a bone matrix, the first and second 3D scaffolds comprises gelatin μRBs with hydroxyapatite simultaneously co-culturing in a medium the plurality of breast cancer cells and the tissue engineered bone comprising a plurality of hMSC-derived osteoblasts or primary bone resident cells and a bone matrix, determining a degree of metastasis, and a speed of metastasis of the breast cancer cells from the first scaffold to the second 3D scaffold comprising the tissue engineered bone by fluorescence imaging based on the first and second fluorescent labels. In some embodiments, the system further comprises at least one additional cell type. In some embodiment, the at least one additional cell type is osteoclasts.

In some embodiments of any one of the spatially patterned 3D co-culture models, methods, or systems herein, the first and second 3D scaffold comprises varying ratios of the natural and synthetic polymers.

In some embodiments, the ratio natural and synthetic polymers and vice versa in the first and second 3D scaffold and vice versa is about 1:1, 1:5, 1:10, 1:15, 1:20, 1:25, 1:30, 1:35, 1:40, 1:45, 1:50, 1:100, 1:250, 1:500, 1:1000, 1:1250, 1:1500, 1:1750, 1:2000, 1:2500, 1:3000, 1:3500, 1:4000, 1:4500, or 1:5000, or a ratio within a range defined by any two of the aforementioned ratios.

In some embodiments, the ratio natural and synthetic polymers and vice versa in the first and second 3D scaffold and vice versa is ranges from about 1:0.01 to about 1:10,000.

In some embodiments, the ratio natural and synthetic polymers and vice versa in the first and second 3D scaffold and vice versa is at least 100-fold below the lower end of the range of about 1:0.01 to about 1:10,000.

In some embodiments, the ratio natural and synthetic polymers and vice versa in the first and second 3D scaffold and vice versa is at least 100-fold above the upper end of the range of about 1:0.01 to about 1:10,000.

Cytokine Production

In some embodiments, the 3D models provided herein are used for characterization of chemokines produced by tissue engineered bone. In some embodiments, the 3D models provided herein are used for characterization of chemokines produced by tissue engineered bone cultured alone and compared with chemokines produced by tissue engineered bone cultured with breast cancer cells.

In some embodiments, the 3D models provided herein are used for characterization of chemokines produced by tissue engineered cartilage. In some embodiments, the 3D models provided herein are used for characterization of chemokines produced by tissue engineered cartilage cultured alone and compared with chemokines produced by tissue engineered cartilage cultured with breast cancer cells, to co-culture with breast cancer cells in 3D and modulation of chemokine production (FIGS. 12(A)-12(B))

In some embodiments, the 3D models provided herein are used for characterization of chemokines produced by tissue engineered bone and compared to chemokines produced by tissue engineered cartilage. In some embodiments, the 3D models provided herein are used for characterization of chemokines produced by tissue engineered bone cultured alone and chemokines produced by tissue engineered cartilage cultured alone and compared with chemokines produced by tissue engineered bone cultured with breast cancer cells and chemokines produced by tissue engineered cartilage cultured with breast cancer cells. In some embodiments, this allows for characterization of chemokines secreted by tissue engineered bone versus cartilage to identify chemokines involved in bone-specific breast cancer cell invasion (FIG. 12(A)). In some embodiments, this allows for characterization of chemokines secreted by tissue engineered bone versus cartilage to identify chemokines involved in cartilage-specific breast cancer cell invasion (FIG. 12(A)).

In some embodiments, protein array of chemokines is used for characterization of chemokines secreted by tissue engineered bone versus cartilage. In some embodiments, protein array of chemokines is used for characterization of chemokines secreted by tissue engineered bone versus cartilage to identify chemokines involved in bone-specific breast cancer cell invasion (FIG. 12(A)). In some embodiments, protein array of chemokines is used for characterization of chemokines secreted by tissue engineered bone versus cartilage to identify chemokines involved in cartilage-specific breast cancer cell invasion (FIG. 12(A)).

Figure 12A:
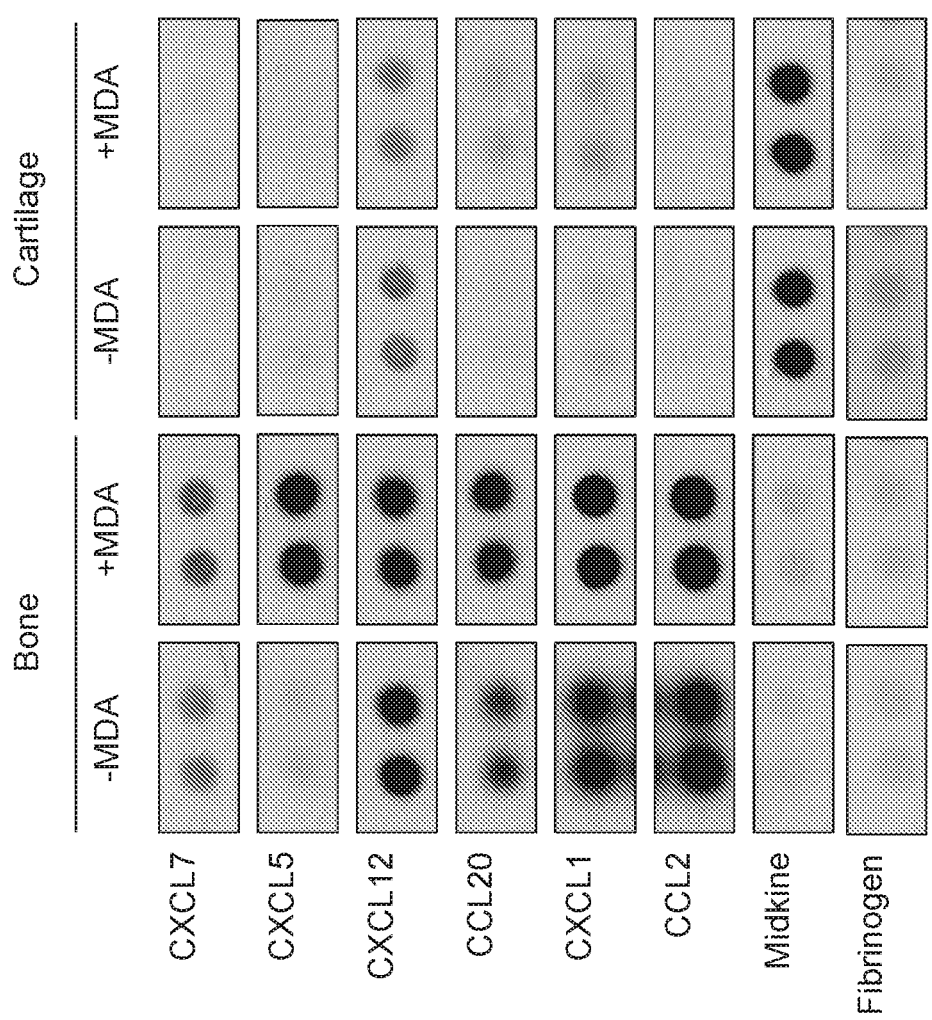
FIGS. 12(A)-12(B) show characterization of chemokines secreted by tissue engineered bone versus cartilage to identify chemokines involved in bone-specific breast cancer cell invasion.

In some embodiments, protein arrays shows that tissue engineered bone cultured alone exhibits a distinct chemokine expression profile as compared to tissue engineered cartilage cultured alone (−MDA in FIG. 12(A)). In some embodiments, protein arrays shows that co-culture of tissue engineered bone or cartilage with breast cancer cells further modulates the type and amount of chemokine production by the tissue engineered bone or cartilage (+MDA in FIG. 12(A)).

In some embodiments, the amount of production of one or more chemokines by the tissue engineered bone or cartilage can be quantified. In some embodiments, the amount of production of one or more chemokines by the tissue engineered bone or cartilage is quantified by calculating a signal density of the one or more chemokines on a protein array (FIGS. 12(A)-12(B)). Non-limiting examples of one or more chemokines include CCL2, CCL20, CXCL1, CXCL5, CXCL7, CXCL12, and Midkine.

In some embodiments of any one of the spatially patterned 3D co-culture models, methods, or systems herein, the first and/or second 3D scaffolds comprises microribbons.

3D Tri-Culture Model

In some embodiments, a 3D tri-culture model is provided. In some embodiments, the 3D tri-culture model comprises osteoclasts, osteoblasts, and cancer cells. In some embodiments, it is contemplated that the 3D tri-culture model can be expanded to a multi-culture model by adding one or more additional cell types (e.g., one or more additional cancer cell types). In some embodiments, it is contemplated that comparative studies can be performed between the various multi-culture models (e.g., a 3D model comprising two cell types, versus a 3D model comprising three cell types or a 3D model comprising three cell types, versus a 3D model comprising four cell types).

In some embodiments, the 3D tri-culture model comprises osteoclasts, osteoblasts, and one or cancer cells that metastasize to the bone. In some embodiments, the 3D tri-culture model comprises osteoclasts, osteoblasts, and breast cancer cells (FIGS. 13(A)-13(B)).

In some embodiments, the 3D tri-culture model comprising osteoclasts, osteoblasts, and cancer cells can be used to mimic clinical outcomes of providing one or more anti-cancer treatments. In some embodiments, the 3D tri-culture model comprising osteoclasts, osteoblasts, and breast cancer cells to mimic clinical outcomes of hormone treatment of breast cancer patients. In some embodiments, the hormone is continuous. In some embodiments, the hormone is intermittent. In some embodiments, the hormone is both continuous and intermittent. In some embodiments, the hormone is continuous followed by intermittent. In some embodiments, the hormone is intermittent followed by continuous.

In some embodiments, the 3D tri-culture model comprising osteoclasts, osteoblasts, and cancer cells can be used to mimic clinical outcomes of providing parathyroid hormone treatment. In some embodiments, the 3D tri-culture model comprising osteoclasts, osteoblasts, and breast cancer cells to mimic clinical outcomes of parathyroid hormone treatment of breast cancer patients. In some embodiments, the parathyroid hormone treatment is continuous. In some embodiments, the parathyroid hormone treatment is intermittent. In some embodiments, the parathyroid hormone treatment is both continuous and intermitted. In some embodiments, the parathyroid hormone treatment is continuous followed by intermittent. In some embodiments, the parathyroid hormone treatment is intermittent followed by continuous.

In some embodiments, the 3D tri-culture model comprising osteoclasts, osteoblasts, and cancer cells is used to assess the effect on cancer-induced bone resorption. In some embodiments, the 3D tri-culture model comprising osteoclasts, osteoblasts, and cancer cells is used to assess the effect on hormone treatment on cancer-induced bone resorption. In some embodiments, the 3D tri-culture model comprising osteoclasts, osteoblasts, and cancer cells is used to assess the effect on parathyroid hormone treatment on cancer-induced bone resorption, mimic clinical outcomes of hormone treatment of breast cancer patients.

In some embodiments, an assessment of bone resorption is performed by visualization of changes of bone mineralization. In some embodiments, an assessment of bone resorption is performed by visualization of changes of bone mineralization by using micro-computed tomography (μCT). In some embodiments, an assessment of bone resorption is performed by visualization over 1-7 days. In some embodiments, an assessment of bone resorption is performed by visualization over 1-14 days. In some embodiments, an assessment of bone resorption is performed by visualization over 1-21 days. In some embodiments, an assessment of bone resorption is performed by visualization over 1-28 days.

In some embodiments, the a bi-culture model (comprising osteoblasts+breast cancer cells) is compared to the tri-culture model. In some embodiments, the a bi-culture model (comprising osteoblasts+breast cancer cells) is compared to the tri-culture model, wherein the tri-culture model comprises an additional cell type seeded on top of the scaffolds of the bi-culture model. In some embodiments, the a bi-culture model (comprising osteoblasts+breast cancer cells) is compared to the tri-culture model, wherein the tri-culture model comprises additional osteoclasts seeded on top of the scaffolds of the bi-culture model.

In some embodiments, the results and data obtained with the 3D models provided herein are consistent with the results and data obtained obtained in the clinic. For example, quantification of bone loss data in FIG. 13(B) demonstrate that only intermittent PTH treatment can reduce breast cancer-induced bone resorption. In contrast, continuous treatment with PTH (cPTH) does not reduce breast cancer-induced bone resorption. This observation is consistent with the known clinical outcomes of iPTH versus cPTH, validating the physiological relevance of the 3D tri-culture model for drug screening of breast cancer-bone metastasis.

In some embodiments of any one of the spatially patterned 3D co-culture models, methods, or systems herein, the first and/or second 3D scaffolds comprises microribbons.

EXAMPLES

The following examples are non-limiting and other variants within the scope of the art also contemplated. Methods and/or materials used in these examples are non-limiting examples of what can be used to generate and/or utilized 3D models as disclosed herein.

Example 1—Breast Cancer Metastasis

Using breast cancer-bone metastasis as a model system, the spatially patterned 3D co-culture model can effectively predict bone-specific metastasis was demonstrated (Example 2; FIGS. 1(A)-1(D)). It was also demonstrated that the migration speed correlates with the level of aggressiveness of different breast cancer cells in patients (Example 5; FIGS. 5(A)-5(E)). It was shown that the co-culture model can recapitulate drug-induced inhibition of breast cancer-bone metastasis in vivo (Example 7; FIGS. 7(A)-7(B)). Validating such co-culture models can provide physiologically relevant, low cost in vitro tools for screening and discovering novel drug candidates, and optimization of drug treatment plans using patient-specific cells.

Example 2—Creating a Spatially Patterned Coculture to Mimic Breast Cancer Invasion into Bone FIGS. 1(A)-1(D))

Figure 1C:
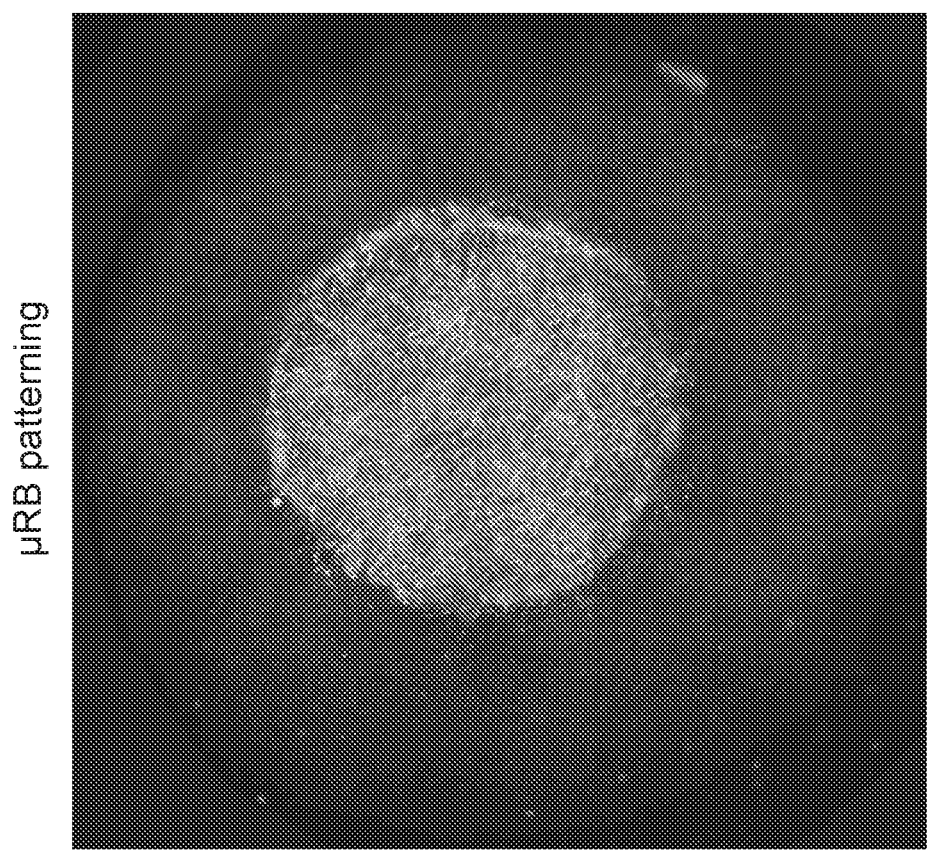
Figure 1D:
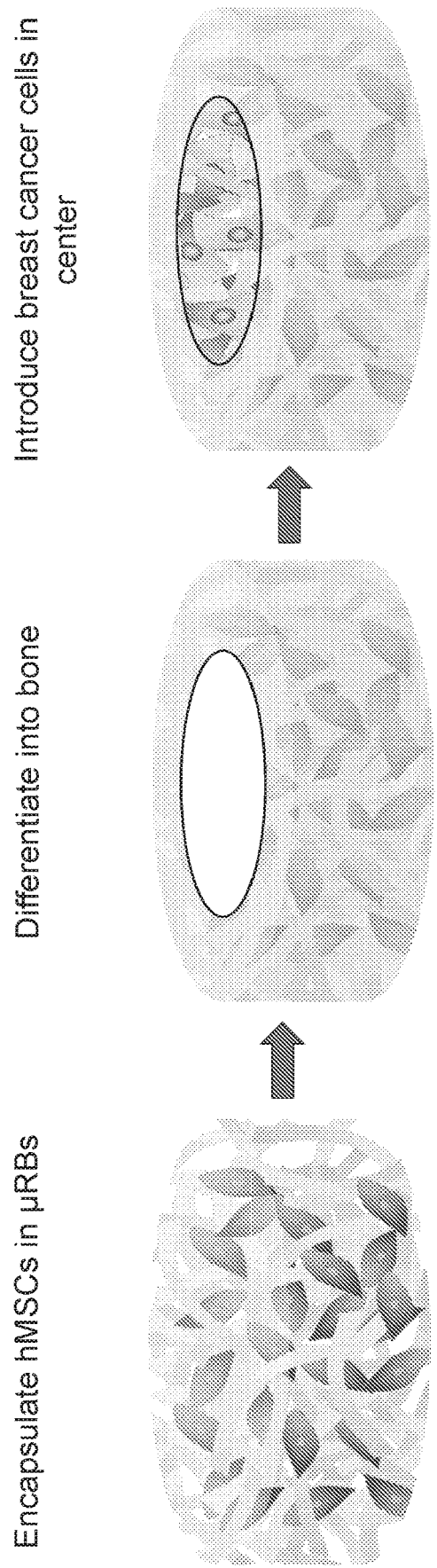
Figure 2:
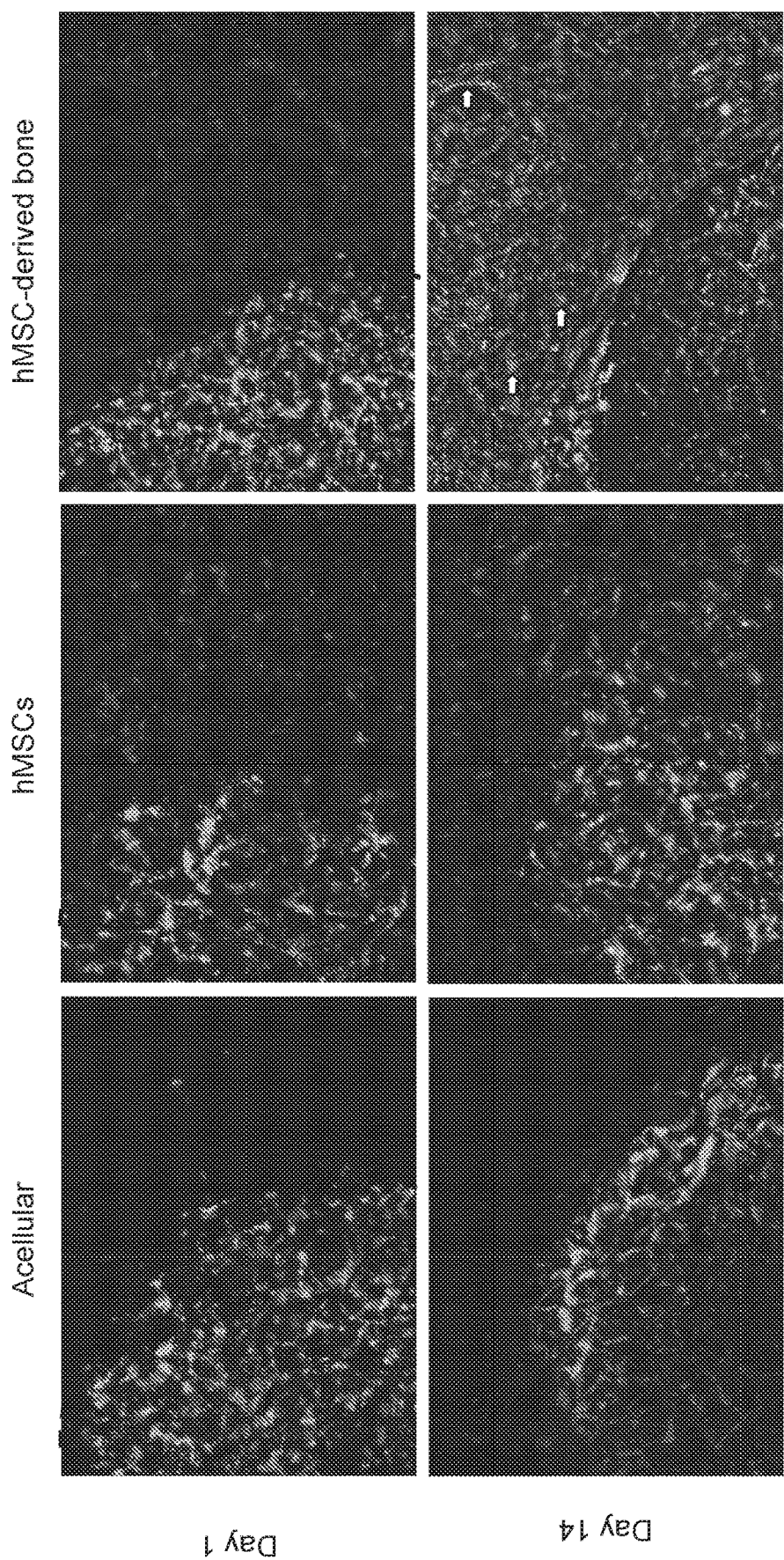
FIG. 2 shows fluorescence images of 3D coculture interface (white dotted line) between breast cancer cells (green) and tissue engineered bone derived from hMSCs (red) demonstrates that while acellular μRB scaffolds and undifferentiated hMSCs do not induce breast cancer cell invasion, tissue engineered bone promotes rapid invasion into bone after 14 days in culture. White arrows indicate selected and representative examples of invading cancer cells. Scale bar=200 μm.

To mimic the microanatomical structures of breast cancer invasion into bone through bone marrow/long bone interface (FIGS. 1A and 1B), a "doughnut shape" 3D co-culture model was developed with mesenchymal stem cell (MSC)-formed tissue engineered bone in the outside ring, and breast cancer cells in the center (FIG. 1C). To facilitate imaging the two cell populations, human MSCs were fluorescently labelled red and breast cancer cells were labeled green (GFP). Gelatin µRBs were synthesized as previously reported [1]. Freeze-dried µRBs were rehydrated in PBS containing 0.05% lithium phenyl-2,4,6-trimethylbenzoylphosphinate photoinitiator. To first fabricate tissue engineered bone, human MSCs were gently mixed with µRB precursor to reach a cell density of 15 million cells/mL, and photocrosslinked (365 nm, 2 mW cm$^{-1}$, 4 min) into disc shape macroporous scaffolds (6 mm in diameter, 1 mm in thickness). Samples were cultured in osteogenic differentiation medium for 28 days to form mineralized bone (FIG. 1D). The osteogenic medium is composed of low glucose DMEM supplemented with 100 nM®-glycerophosphate, 100 nM dexamethasone, 50 µg/mL ascorbic-2-phosphate, 10% FBS, and 1% penicillin/streptomycin. At day 28, a 2 mm diameter disk was cut out from the center of tissue engineered bone, leaving an empty hole in the center. MDA-MB-231 breast cancer cells were encapsulated into gelatin µRBs forming 2 mm diameter disks, which were introduced into the center of tissue-engineered bone, and placed in EMEM growth media for 7 to 14 days. Breast cancer invasion into tissue engineered bone was monitored using fluorescence imaging at the interface between the outer and inner disks.

Figure 3:
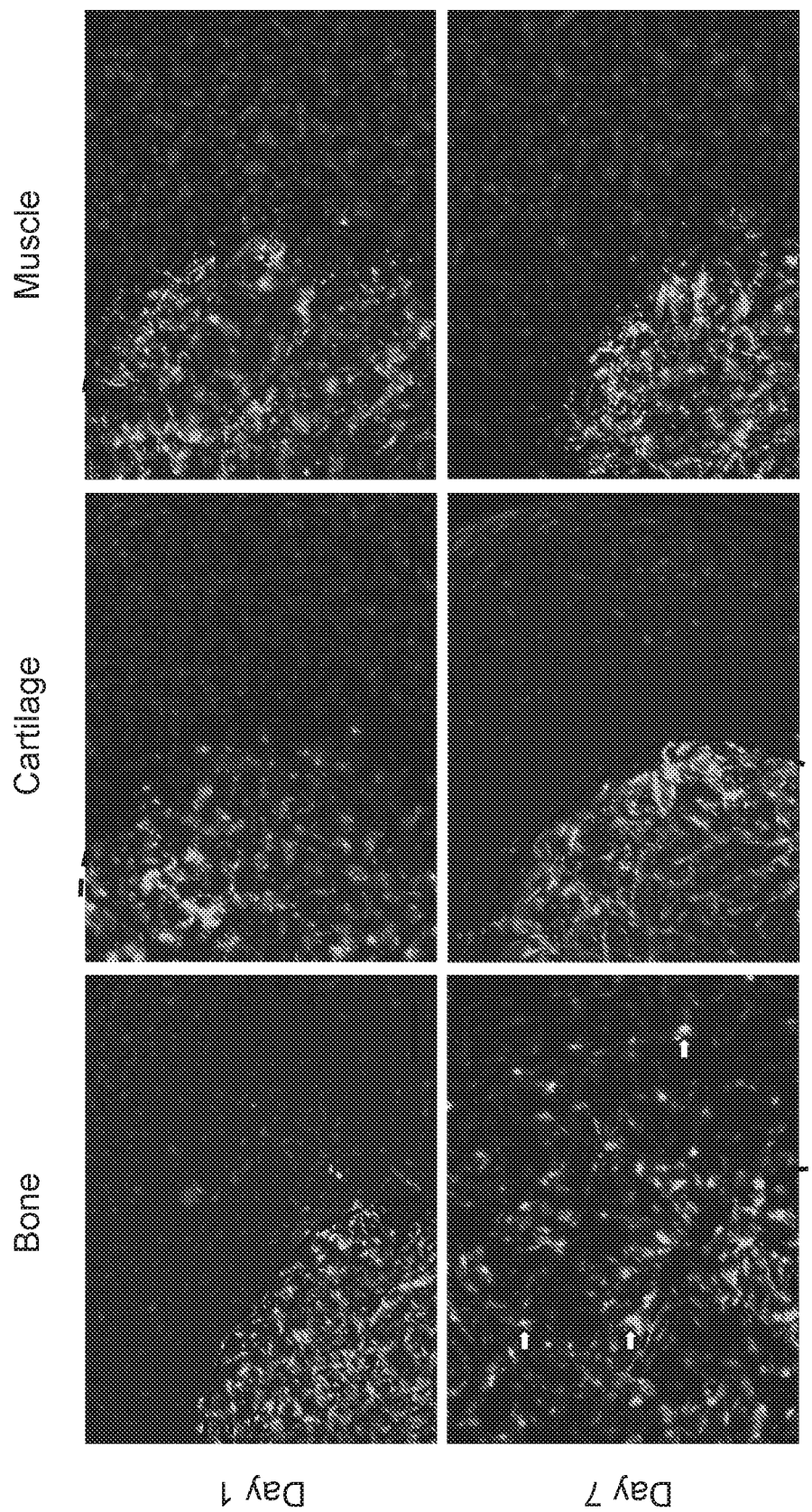
FIG. 3 shows 3D coculture model allows for recapitulating the in vivo finding that breast cancer metastasis into bone is tissue-specific.

Example 3—Evaluating the Tissue-Specificity of Breast Cancer Cell Invasion (FIGS. 2 and 3)

Breast cancer cell invasion into outer rings composed of the following: (1) acellular µRB scaffolds, (2) undifferentiated hMSCs in µRB scaffolds, (3) tissue engineered bone, (4) tissue engineered cartilage, and (5) tissue engineered muscle was evaluated. Tissue engineered bone was developed as previously described.
Acellular µRB Scaffolds and Undifferentiated hMSC Controls Acellular µRB scaffolds were made by hydrating freeze-dried µRBs with PBS containing 0.05% lithium phenyl-2,4,6-trimethylbenzoylphosphinate photo-initiator and 3.5% hydroxyapatite nanoparticles (HAnp) and photo-crosslinking (365 nm, 2 mW cm$^{-1}$, 4 min) into disc shape macroporous scaffolds (6 mm in diameter, 1 mm in thickness). Outer rings of undifferentiated hMSCs were made using the same formulation, but 15 million/mL hMSCs were added prior to photo-crosslinking. These hMSCs were cultured in growth media directly without osteogenic differentiation.
Tissue Engineered Cartilage In order to make tissue engineered cartilage, hMSCs were gently mixed with υRB precursor to reach a cell density of 15 million cells/mL, and photocrosslinked (365 nm, 2 mW cm$^{-1}$, 4 min) into disc shape macroporous scaffolds (6 mm in diameter, 1 mm in thickness). Samples were cultured in chondrogenic differentiation medium for 21 days to form cartilage tissue. The chondrogenic medium is composed of high glucose DMEM supplemented with 100 nM dexamethasone, 50 µg/mL ascorbic-2-phosphate, 5 µg/mL proline, 1 mM sodium pyruvate, 5 µg/mL ITS premix, 10 ng/mL TGF-®3, and 1% penicillin/streptomycin. At day 21, a 2 mm diameter disk was cut out from the center of tissue engineered cartilage, leaving an empty hole in the center. MDA-MB-231 breast cancer cells were encapsulated into gelatin µRBs forming 2 mm diameter disks, which were introduced into the center of tissue-engineered cartilage and placed in EMEM growth media for 7 days.
Tissue Engineered Muscle To make tissue engineered muscle, C2C12 muscle stem cells were gently mixed with µRB precursor to reach a cell density of 15 million cells/mL, and photocrosslinked (365 nm, 2 mW cm$^{-1}$, 4 min) into disc shape macroporous scaffolds (6 mm in diameter, 1 mm in thickness). Samples were cultured in myogenic differentiation medium for 7 days to form muscle tissue. The myogenic medium is composed of high glucose DMEM supplemented with and 1% penicillin/streptomycin. At day 7, a 2 mm diameter disk was cut out from the center of tissue engineered muscle, leaving an empty hole in the center. MDA-MB-231 breast cancer cells were encapsulated into gelatin µRBs forming 2 mm diameter disks, which were introduced into the center of tissue-engineered muscle and placed in EMEM growth media for 7 days. Breast cancer invasion into all groups was performed using fluorescence imaging at the interface between the outer and inner disks over 7 days.

Data are shown in FIG. 2 and FIG. 3. It was demonstrated that tissue-engineered bone, but not undifferentiated hMSCs or acellular µRB scaffold, induces breast cancer cell invasion (FIG. 2), and that tissue engineered bone, but not tissue engineered cartilage or muscle, supported breast cancer cell invasion (FIG. 3).

Example 4—Evaluating Respective Contribution of Cellular Vs Acellular Components of Bone in Promoting Breast Cancer Invasion (FIG. 4)

To decouple the contributions of cellular and acellular (matrix) components of bone, breast cancer invasion into outer disks composed the following groups (1) osteoblasts alone, (2) decellularized tissue engineered bone, and (3) full tissue engineered bone was evaluated.
hMSC-Derived Osteoblasts One million hMSCs were seeded onto tissue culture flasks and cultured in osteogenic differentiation media for 28 days to form osteoblasts. After 28 days, hMSC-derived osteoblasts were gently mixed with µRB precursor to reach a cell density of 15 million cells/mL, and photocrosslinked (365 nm, 2 mW cm$^{-1}$, 4 min) into disc shape macroporous scaffolds (6 mm in diameter, 1 mm in thickness). MDA-MB-231 breast cancer cells were encapsulated into gelatin µRBs forming 2 mm diameter disks, which were introduced into the center of tissue-engineered bone, and placed in EMEM growth media for 7 days.

Decellularized Tissue Engineered Bone

Tissue engineered bone was generated as previously described. After 28 days of culturing in osteogenic differentiation media, tissue engineered bone was placed in 1% Triton-X and incubated on a shaker for 8 hours followed by 2 rounds of one-hour washes in PBS. After washing, a 2 mm diameter disk was cut out from the center of tissue engineered bone, leaving an empty hole in the center. MDA-MB-231 breast cancer cells were encapsulated into gelatin μRBs forming 2 mm diameter disks, which were introduced into the center of tissue-engineered bone and placed in EMEM growth media for 7 days. Breast cancer invasion into all groups was performed using fluorescence imaging at the interface between the outer and inner disks over 7 days.

Data are shown in FIG. 4. It was demonstrated that 3D coculture model allowed independent evaluation of the respective components of bone in driving bone metastasis.

Example 5—Evaluating the Prediction of Breast Cancer Cell Aggressiveness and Rate of Metastasis into Bone (FIGS. 5(A)-5(C)

To evaluate the effect of breast cancer cell aggressiveness in their invasion rate into bone, MDA-MB-231 breast cancer cells (more aggressive) were compared to MCF-7 breast cancer cells (less aggressive). Tissue engineered bone was generated as described previously. MDA-MB-231 and MCF-7 breast cancer cells were encapsulated into gelatin μRBs forming 2 mm diameter disks, which were introduced into the center of tissue-engineered bone and placed in EMEM growth media for 7 days. Breast cancer invasion into all groups was performed using fluorescence imaging at the interface between the outer and inner disks over 7 days. Cell proliferation was tracked over the culture period using bioluminescence imaging.

The data showed that the 3D coculture model allows the prediction of breast cancer cell aggressiveness and rate of metastasis to bone.

Figure 6B:
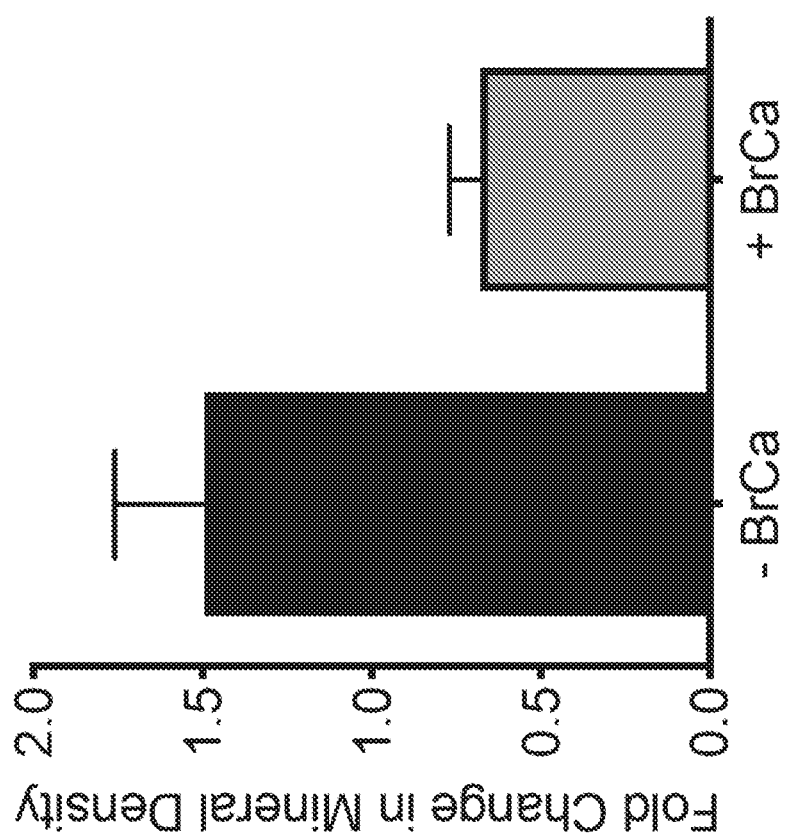

Example 6—Evaluating the Effect of Breast Cancer on Mineral Density of Tissue Engineered Bone (FIGS. 6(A)-6(B))

Bone mineral density was evaluated over 14 days by comparing tissue engineered bone cultured with (+BrCa) and without (−BrCa) breast cancer cells. Cocultures of tissue engineered bone with MDA-MB-231 were generated as described previously and cultured in EMEM GM for 14 days. Bone mineralization was monitored using X-ray microcomputed tomography (GE CT120) with setting of 100 kV X-ray voltage, 500 μA current, 50 μm voxel resolution and continuous 360° rotation scanning. Reconstructed 3D μCT images will be analyzed for changes in bone mineral density using Parallax Microview.

Data showed that the 3D coculture model recapitulated breast cancer cell induced decrease in mineral content (FIGS. 6(A)-6(B)).

Figure 8B:
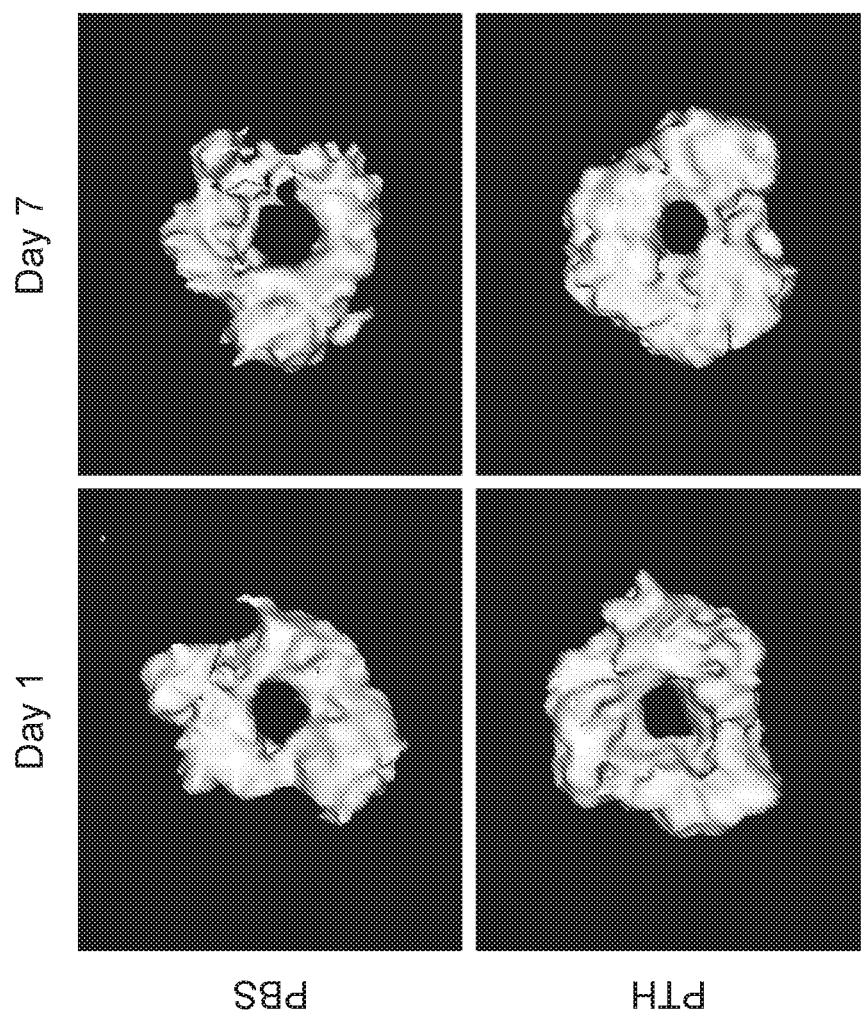

Example 7—Evaluating the Effect of PTH Treatment on Breast Cancer Invasion and Proliferation (FIGS. 7(A)-7(B)) and Bone Mineral Density (FIGS. 8(A)-8(C))

Cocultures of MDA-MB-231 and tissue engineered bone were developed as previously described. Upon starting the coculture, scaffolds were treated with 1 μg/mL of parathyroid hormone (PTH) or PBS control for 6 hours every 48 hours. Breast cancer cell invasion into tissue-engineered bone was monitored using fluorescence microscopy every other day for 7 days. Bone mineralization was monitored using X-ray microcomputed tomography (GE CT120) with setting of 100 kV X-ray voltage, 500 μA current, 50 μm voxel resolution and continuous 360° rotation scanning. Reconstructed 3D μCT images were analyzed for changes in bone mineral density using Parallax Microview. Osteoblast cell proliferation was tracked over the culture period using bioluminescence imaging.

The results demonstrated that 3D coculture model recapitulated PTH induced inhibition of breast cancer metastasis to bone without impacting cancer cell proliferation (FIGS. 7(A)-7(B)). The data also showed that 3D coculture model recapitulated PTH-induced enhancement of osteoblast cell survival and bone mineralization (FIGS. 8(A)-8(C)).

Example 8—Evaluating the Effect of Breast Cancer Cells of Varying Aggressiveness in Inducing Osteoclast-Mediated Bone Resorption (FIG. 9(A)-9(B)

In order to assess the effect of breast cancer in promoting osteoclast activation and bone resorption, the bone mineral density of (1) tissue engineered bone alone (No BrCa), (2) tissue engineered bone+MDA-MB-231 breast cancer cells, and (3) tissue engineered bone+MCF-7 breast cancer cells were evaluated. Tissue engineered bone was developed as described previously. After 28 days in osteogenic media, a 2 mm diameter disk was cut out from the center of tissue engineered bone, leaving an empty hole in the center. Prior to introducing breast cancer cells, 1 million osteoclasts were seeded directly over tissue engineered bone and incubated for 1 hour to allow cells to attach. MDA-MB-231 and MCF-7 breast cancer cells were encapsulated into gelatin μRBs forming 2 mm diameter disks, which were introduced into the center of tissue-engineered bone, and placed in EMEM growth media for 7 days. Bone mineralization was monitored using X-ray microcomputed tomography (GE CT120) with setting of 100 kV X-ray voltage, 500 μA current, 50 μm voxel resolution and continuous 360° rotation scanning. Reconstructed 3D μCT images were analyzed for changes in bone mineral density using Parallax Microview.

The data demonstrated that 3D coculture model recapitulatd breast cancer cell induction of bone resorption and level of resorption predicts breast cancer cell aggressiveness.

Example 9—Evaluating the Effect of Mineral Composition and Particle Size on Tissue Engineered Bone Formation (FIG. 10)

The following μRB compositions: (1) gelatin μRBs alone, (2) gelatin μRBs+hydroxyapatite nanoparticles (HAnp, <200 nm), (3) gelatin μRBs+hydroxyapatite microparticles (HAμp, 5 μm), and (4) gelatin μRBs+tricalcium phosphate microparticles (TCPμp, 5 μm) were evaluated. Freeze-dried μRBs were rehydrated in PBS containing 0.05% lithium phenyl-2,4,6-trimethylbenzoylphosphinate photoinitiator. Mineral containing groups were also hydrated using 3.5% solution of either HAnp, HAμp, or TCPμp. Human MSCs were gently mixed with μRB precursor to reach a cell density of 15 million cells/mL, and photocrosslinked (365 nm, 2 mW cm$^{-1}$, 4 min) into disc shape macroporous scaffolds (6 mm in diameter, 1 mm in thickness). Samples were cultured in osteogenic differentiation medium for 28 days to form mineralized bone. Bone formation was evaluated using histological staining for samples harvested at 7, 21, and 28 days. Alizarin Red staining was performed to detect bone mineral deposition and Masson's Trichrome staining was used to detect collagen matrix deposition and each time point.

The results showed that tissue-engineered bone can be derived using hydroxyapatite and tricalcium phosphate-based mineral coating.

Example 10—Evaluating the Effect of Bone Derived from Various Mineral Composition and Particle Size on Promoting Breast Cancer Cell Invasion (FIG. 11)

The effect of bone derived from various mineral composition and particle size on promoting breast cancer cell invasion was evaluated. The effect of the following µRB compositions: (1) gelatin µRBs+HAµp and (2) gelatin µRBs+TCPµp was evaluated. Each of these compositions was utilized to generate (1) full tissue engineered bone, (2) decellularized, tissue engineered bone, and (3) acellular µRB scaffolds. Outer ring scaffolds for each group were generated as previously described. MDA-MB-231 breast cancer cells were encapsulated into gelatin µRBs forming 2 mm diameter disks, which were introduced into the center of tissue-engineered bone and placed in EMEM growth media for 7 days. Breast cancer invasion into all groups was performed using fluorescence imaging at the interface between the outer and inner disks over 7 days.

The results showed that tissue-engineered bone derived using hydroxyapatite (HA) and tricalcium phosphate (TCP)-based minerals support breast cancer cell invasion.

Figure 12B:
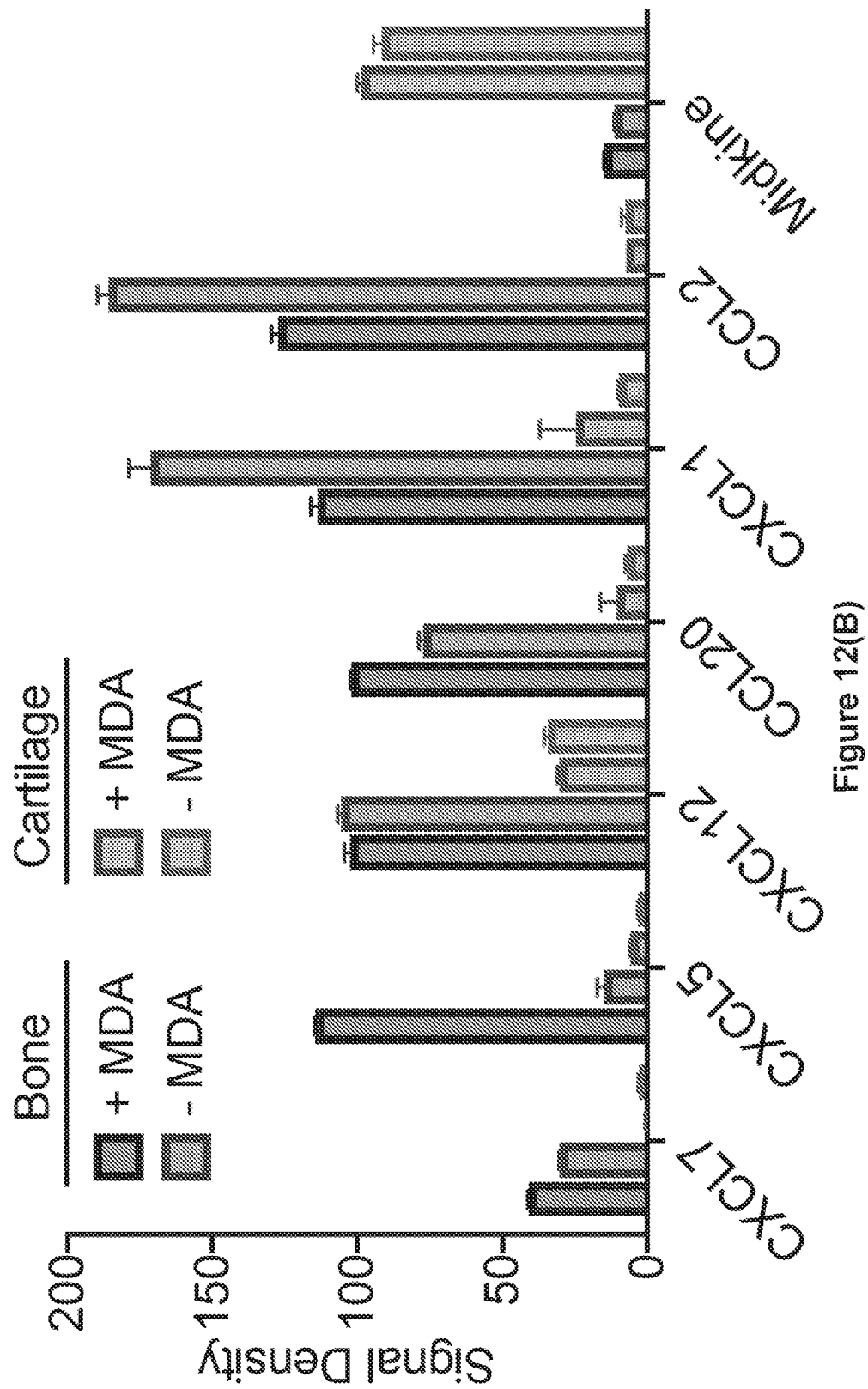

Example 11—Characterization of Co-Culture with Breast Cancer Cells in 3D and Modulation of Chemokine Droduction (FIGS. 12(A)-12(B))

Characterization of co-culture with breast cancer cells in 3D showed further modulation of chemokine production. Chemokines secreted by tissue engineered bone versus cartilage was utilized to identify chemokines involved in bone-specific breast cancer cell invasion.

FIG. 12(A) shows protein array of chemokines produced by tissue engineered bone and tissue engineered cartilage cultured alone (−MDA) or with breast cancer cells (+MDA) using 3D co-culture. FIG. 12(B) shows quantification of chemokines.

Results showed that tissue engineered bone exhibits a distinct chemokine expression profile from cartilage, and co-culture with breast cancer cells further modulates the type and amount of chemokine production.

Figure 13A:
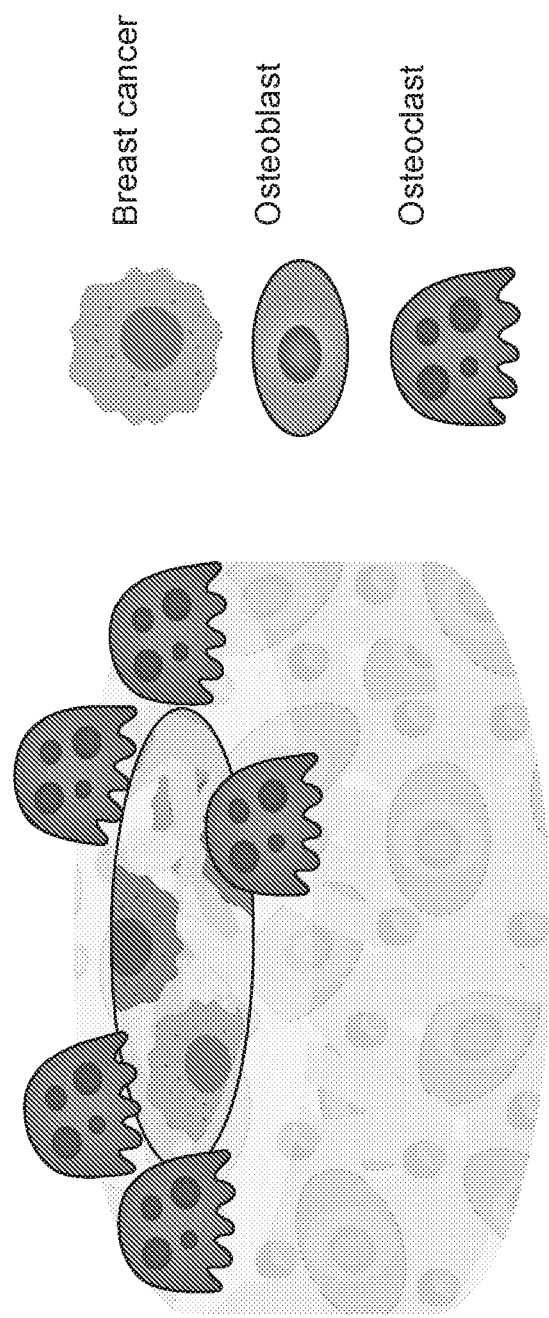
FIGS. 13(A)-13(C) show validation of a 3D tri-culture model comprising osteoclasts, osteoblasts, and breast cancer cells to mimic clinical outcomes effects of parathyroid hormone treatment on breast cancer patients.
Figure 13B:
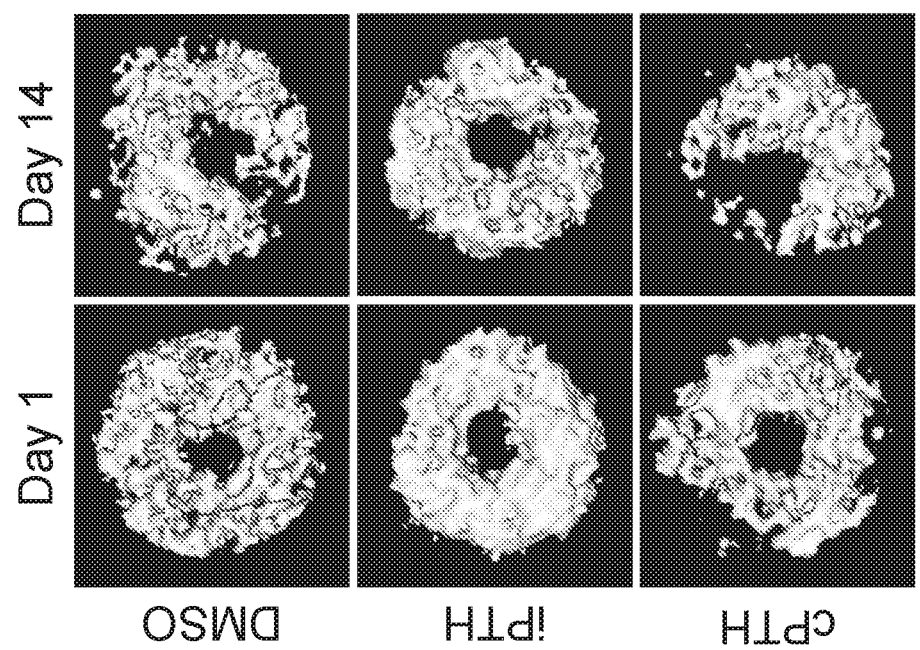
Figure 13C:
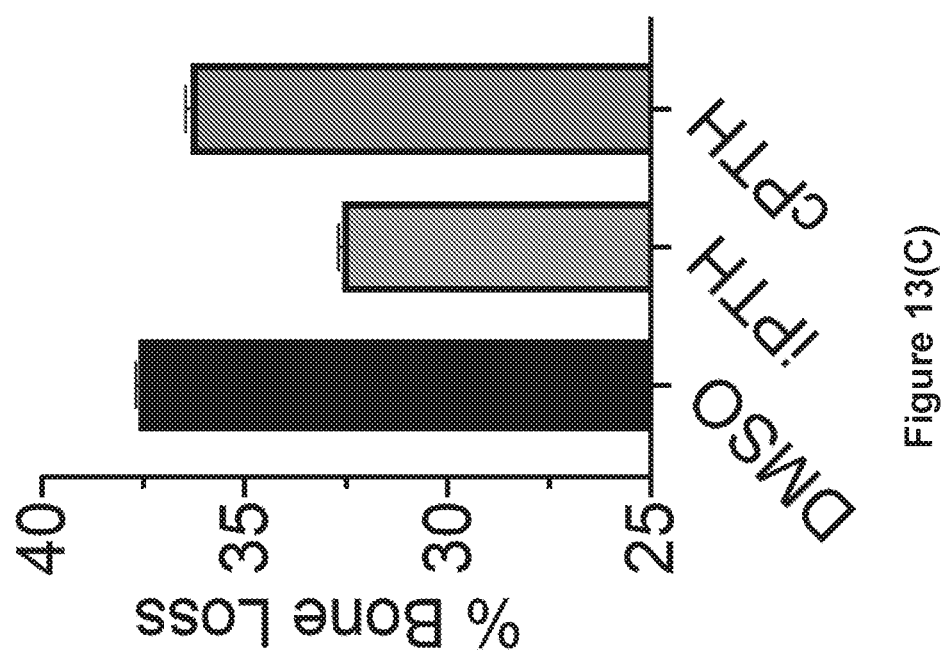

Example 12—Validating a 3D Tri-Culture Model Comprising Osteoclasts, Osteoblasts, and Breast Cancer Cells (FIGS. 13(A)-13(B))

Validation was performed of a 3D tri-culture model that includes osteoclasts, osteoblasts, and breast cancer cells to mimic clinical outcomes effects of parathyroid hormone treatment on breast cancer patients.

FIG. 13(A) shows visualization of changes of bone mineralization over 14 days in breast cancer/bone tri-culture model using micro-computed tomography (µCT). Compared to the bi-culture model earlier (osteoblasts+breast cancer cells), this tri-culture model involves additional osteoclasts seeded on top of the scaffolds. Three groups include DMSO (control without drug), intermittent parathyroid hormone treatment (iPTH), and continuous PTH treatment (cPTH).

FIG. 13(B) shows quantification of bone loss demonstrates that only intermittent PTH treatment can reduce breast cancer-induced bone resorption. Continuous treatment with PTH (cPTH) does not reduce breast cancer-induced bone resorption. This trend is consistent with the known clinical outcomes of iPTH vs. cPTH, validating the physiological relevance of our 3D tri-culture model for drug screening of breast cancer-bone metastasis.

Results showed that only intermittent PTH treatment, but not continuous PTH treatment reduces breast cancer induced bone loss.

REFERENCES

US20140017284A1—Macroporous 3-D scaffolds for tissue engineering.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. For example, "about 5", shall include the number 5. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A spatially-patterned 3D co-culture model, comprising:
a first 3D scaffold comprising a plurality of tumor cells/cancer cells obtained and isolated from a tumor/cancer biopsy, and
a second 3D scaffold comprising plurality of cells from a target tissue of potential metastasis,
wherein the first and second 3D scaffolds interface with each other such that the first 3D scaffold is completely surrounded by, partially surrounded by, and/or overlaid with the second 3D scaffold, and wherein the spatially-patterned 3D co-culture model is configured to assess metastatic characteristics of the tumor cell/cancer cells towards the target tissue.

2. The spatially-patterned 3D co-culture model of claim 1, wherein the target tissue is selected from the group consisting of bone, cartilage, liver, lung, peritoneum, adrenal gland, pancreas, brain, spleen, kidney, prostate, skin, muscle, and bone marrow.

3. The spatially-patterned 3D co-culture model of claim 1, wherein the tumor cells/cancer cells are obtained from a tumor/cancer selected from the group consisting of breast cancer, prostate cancer, colon cancer, skin cancer, ovary cancer, lung cancer, brain cancer, liver cancer, esophageal cancer, adenocarcinoma, pancreatic cancer, blood cancer, bone cancer, and sarcomas.

4. The spatially-patterned 3D co-culture model of claim 1, wherein the metastatic characteristics comprise degree of metastasis and speed of metastasis.

5. The spatially-patterned 3D co-culture model of claim 1, wherein the model is configured to assess an effect of metastatic cancer cells on target tissues or the effect of target tissues on metastatic cancer cells, wherein the effect comprises changes in cell signaling, cell fates, cell proliferation, tissue degradation, tissue resorption, or combinations thereof.

6. The spatially-patterned 3D co-culture model of claim 4, wherein the degree of metastasis is determined by the fraction of the cancer cells that have migrated from the second 3D scaffold to the first 3D scaffold.

7. The spatially-patterned 3D co-culture model of claim 1, wherein the first and/or second 3D scaffold comprise a natural polymer selected from the group consisting of gelatin, hydroxyapatite, tricalcium phosphates, glycosaminoglycans, hyaluronic acid, chondroitin sulfate, heparin sulfate, and, combinations thereof and/or a synthetic polymer selected from the group consisting of poly(ethylene glycol), poly(lactic-co-glycolic acid), poly(lactic acid), poly(glycolic acid), polycaprolactone, and combinations thereof.

8. The spatially-patterned 3D co-culture model of claim 7, wherein the first and second 3D scaffold comprises a co-spun 3D scaffold with varying ratios of the natural and synthetic polymers, a physical mixture of co-spun 3D scaffolds with varying ratios of the natural and synthetic polymers, and/or a combination thereof.

9. The spatially-patterned 3D co-culture model of claim 1, wherein the first and second 3D scaffold comprises a decellularized extracellular matrix composition from one or more tissues selected from the group consisting of bone, cartilage, muscles, lung, peritoneum, fat, brain, liver, spleen, lymph node, pancreas, skin, breast, and prostate.

10. The spatially-patterned 3D co-culture model of claim 1, wherein the first and second 3D scaffold comprises components mimicking minerals in native extracellular matrix including hydroxyapatite nanoparticles, hydroxyapatite microparticles, tricalcium phosphate nanoparticles, tricalcium phosphate microparticles, and other biomineral cues.

11. The spatially-patterned 3D co-culture model of claim 1, configured for assessing chemokine product and/or modulation of chemokine production by the target tissue, the tissue of potential metastasis, the tissue engineered bone, or an effect of soluble factor(s).

12. The spatially-patterned 3D co-culture model of claim 1, further comprising at least one additional cell type.

13. The spatially-patterned 3D co-culture model of claim 12, wherein the at least one additional cell type is osteoclasts.

14. The spatially-patterned 3D co-culture model of claim 1, wherein the first and/or second 3D scaffold comprises microribbons.

15. A method of drug screening of anti-cancer therapeutics, the method comprising:
obtaining a spatially-patterned 3D co-culture model according to claim 1;
assessing an effect of a single or combinations of potential anti-cancer therapeutics on mitigating cancer metastasis, and/or reducing cancer-induced damage to target tissues including changes in cell signaling, cell fates, and tissue responses.

16. A method of personalized drug screening of anti-cancer therapeutics, the method comprising:
  obtaining a spatially-patterned 3D co-culture model according to claim 1 comprising cancer cells derived from patients;
  assessing a patient-specific drug response and choosing an optimal treatment regimen of anti-cancer therapeutics for mitigating cancer metastasis, and/or reducing cancer-induced damage to target tissues including changes in cell signaling, cell fates, and tissue responses.

17. A method of predicting cancer metastasis, comprising providing a spatially-patterned 3D co-culture model according to claim 1;
  determining a speed of migration and a degree of migration of the plurality of cells from the tumor/the cancer to the target tissue of potential metastasis, or for assessing the effect of metastatic cancer cells on target tissues including changes in cell signaling, cell fates and tissue responses.

18. A method of predicting cancer metastasis, comprising providing a spatially-patterned 3D co-culture model according to claim 1;
  determining an effect of metastatic cancer cells on target tissues.

19. A method for evaluating the potential for a tumor cell to metastasize from a first tissue to a second tissue, comprising:
  obtaining a plurality of tumor/cancer cells from a subject;
  introducing at least a portion of the plurality of tumor/cancer cells into a first 3D scaffold;
  introducing the first 3D scaffold into a second 3D scaffold comprising a plurality of cells from a target tissue into which the tumor/cancer cells potentially metastasize;
  assembling the first and the second 3D scaffolds to generate a physical interface between the scaffolds that mimics an in vivo environment where a potential metastasis of the tumor/cancer cells could occur;
  co-culturing the assembled scaffolds for a period of time sufficient to allow a portion of the tumor/cancer cells in the first 3D scaffold to infiltrate the second 3D scaffold; and
  evaluating the degree of infiltration.

20. The method of claim 19, wherein the cells of the second 3D scaffold are obtained from the subject.

21. The method of claim 19, wherein the tumor cells are breast cancer cells or prostate cancer cells.

22. The method of claim 19, wherein the cells in the second scaffold are bone cells.

23. The method of claim 19, wherein the evaluation of infiltration is determined using fluorescence microscopy.

24. The method of claim 19, further comprising calculating a value for the degree of infiltration of the tumor cells and comparing that value to a value for a degree of infiltration of a known aggressive cell line.

* * * * *